(12) United States Patent

Yamada

(10) Patent No.: US 9,253,368 B2
(45) Date of Patent: Feb. 2, 2016

(54) IMAGE PROCESSING DEVICE SETTING BINARY VALUE WITHOUT USING DITHER MATRIX WHEN PRESCRIBED CONDITION IS SATISFIED

(71) Applicant: BROTHER KOGYO KABUSHIKI KAISHA, Nagoya, Aichi (JP)

(72) Inventor: Ryuji Yamada, Ogaki (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/490,995

(22) Filed: Sep. 19, 2014

(65) Prior Publication Data

US 2015/0092244 A1  Apr. 2, 2015

(30) Foreign Application Priority Data

Sep. 30, 2013  (JP) .................................. 2013-204522

(51) Int. Cl.
*H04N 1/405* (2006.01)
*G06K 9/46* (2006.01)
*H04N 1/409* (2006.01)

(52) U.S. Cl.
CPC .............. *H04N 1/405* (2013.01); *G06K 9/4604* (2013.01); *H04N 1/4092* (2013.01)

(58) Field of Classification Search
CPC ... H04N 1/4052; H04N 1/4092; H04N 1/405; H04N 1/40062; H04N 1/52; H04N 1/58; G06T 2207/20192; G06T 2207/20182; G06T 5/002; G06T 15/205; G06T 5/003; G06T 5/20; G06T 7/0083

USPC .............. 358/1.9, 2.1, 3.14–3.15, 3.26–3.27; 382/266–269, 199
See application file for complete search history.

(56) References Cited

U.S. PATENT DOCUMENTS

| 5,777,758 | A  | * | 7/1998 | Tanabe | ........................... 358/1.9 |
| 6,842,268 | B1 | * | 1/2005 | van Strijp et al. | ............ 358/3.06 |
| 2010/0177115 | A1 | * | 7/2010 | Schweid | ........................ 345/596 |
| 2012/0020569 | A1 | * | 1/2012 | Mita | ............................. 382/199 |

FOREIGN PATENT DOCUMENTS

| JP | 2001-157047 A | 6/2001 |
| JP | 2009-031878 A | 2/2009 |
| JP | 2010278933 A | * 12/2010 |

* cited by examiner

*Primary Examiner* — Thomas D Lee
*Assistant Examiner* — Stephen M Brinich
(74) *Attorney, Agent, or Firm* — Scully, Scott, Murphy & Presser, P.C.

(57) ABSTRACT

An image processing device includes a controller. The controller specifies an edge pixel based on image data, and sets a target pixel and a reference pixel from among a plurality of pixels. The target pixel is located between the edge pixel and the reference pixel. The controller determines whether a determination condition is satisfied for the target pixel. The determination condition indicates that a pixel value of the edge pixel, a pixel value of the target pixel, and a pixel value of the reference pixel monotonically increase in said order. The controller sets a binary value of the target pixel to a first value without using a dither matrix when the determination condition is satisfied, and sets the binary value of the target pixel to one of the first value and a second value by using the dither matrix when the determination condition is not satisfied.

13 Claims, 17 Drawing Sheets

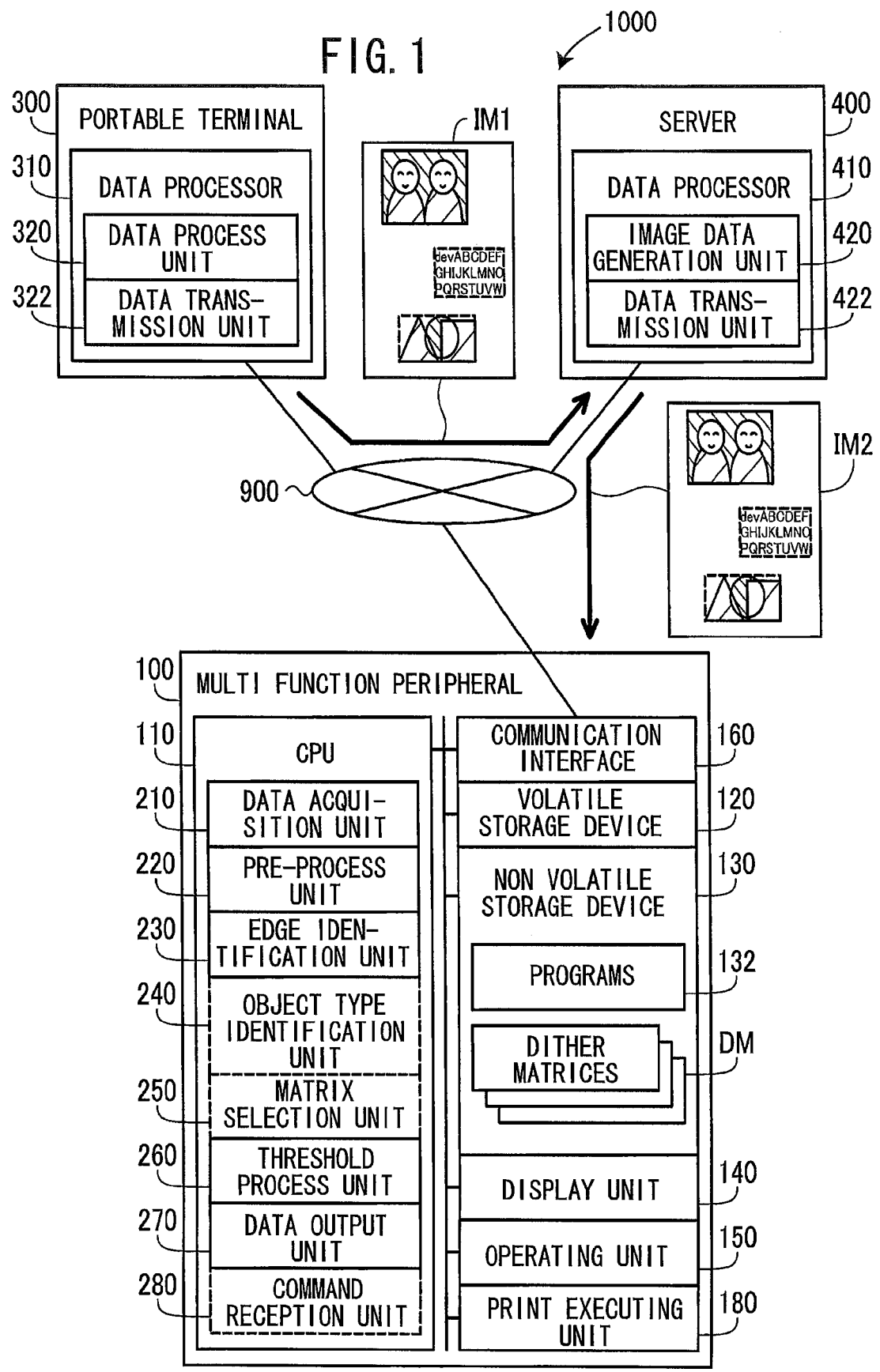

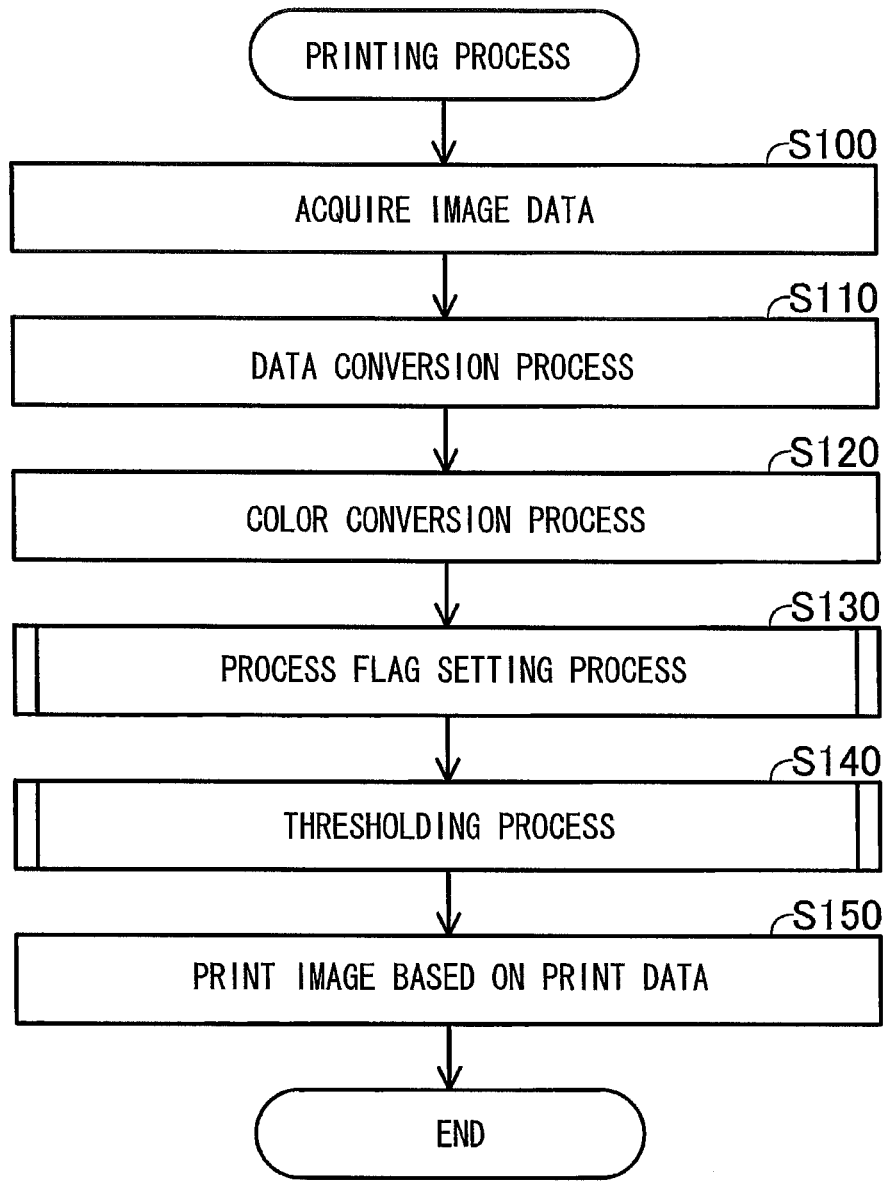

FIG. 3(A)
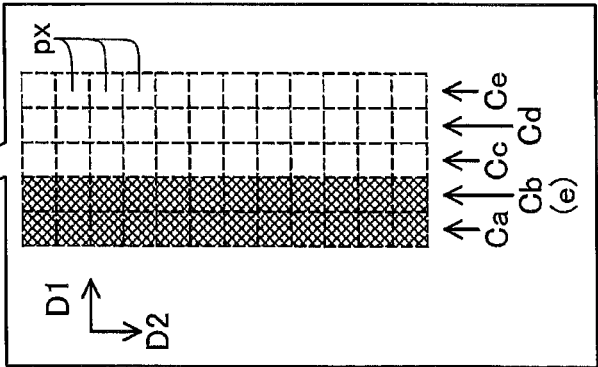
FIG. 3(B)
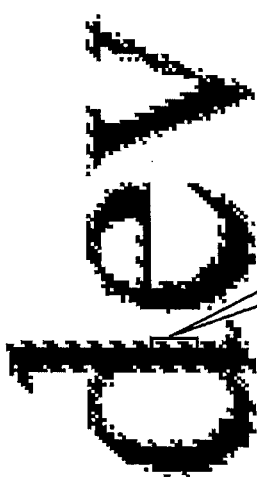
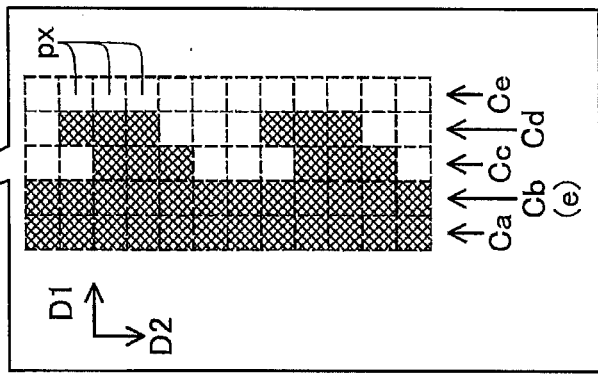
FIG. 3(C)
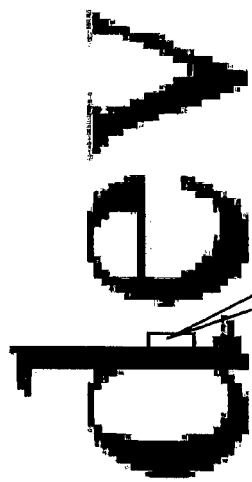
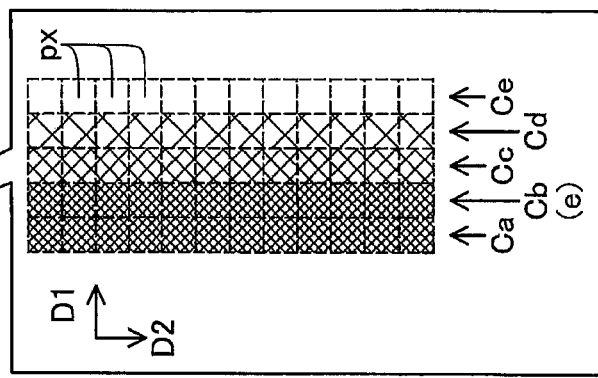

IMAGE PROCESSING DEVICE SETTING BINARY VALUE WITHOUT USING DITHER MATRIX WHEN PRESCRIBED CONDITION IS SATISFIED

CROSS REFERENCE TO RELATED APPLICATION

This application claims priority from Japanese Patent Application No. 2013-204522 filed Sep. 30, 2013. The entire content of the priority application is incorporated herein by reference.

TECHNICAL FIELD

The present invention relates to an image process for processing image data to be printed.

BACKGROUND

Various image processes for processing data to be printed are well known in the art. One process proposed in Japanese patent application publication No. 2009-31878 is an anti-aliasing process for temporarily generating image data of a resolution higher than the resolution capacity of the image-forming device and subsequently converting the image data to a resolution and number of tones (or gradations) suited to the image-forming device.

SUMMARY

In some cases, an image processing device generates binary image data representing patterns in individual colors in order to print an image using colorants. The process for generating binary image data, often called a thresholding process, may be a process that employs dither matrices. Further, the image data generated prior to the thresholding process, as in the anti-aliasing process mentioned above, may represent parts of an image that include edges (outlines of objects, for example) using intermediate tones. When such edge parts of an image are thresholded using a dither matrix, the patterns in the dither matrix representing intermediate tones near edges may appear unnatural.

In view of the foregoing, it is an object of the present invention to provide an image processing device that avoids a loss of image quality caused by the use of dither matrices in the thresholding process.

In order to attain the above and other objects, the invention provides an image processing device including a controller. The controller is configured to perform: receiving image data representing an image, the image having a plurality of pixels, the image data having a plurality of pixel values corresponding to the plurality of pixels; specifying an edge pixel based on the image data, the edge pixel representing an edge; setting a target pixel and a reference pixel from among the plurality of pixels, the reference pixel being located out of the edge, the target pixel being located between the edge pixel and the reference pixel; determining whether a determination condition is satisfied for the target pixel, the determination condition indicating that a pixel value of the edge pixel, a pixel value of the target pixel, and a pixel value of the reference pixel monotonically increase in said order; setting a binary value of the target pixel to a first value without using a dither matrix when the determination condition is satisfied for the target pixel; and setting the binary value of the target pixel to one of the first value and a second value different from the first value by using the dither matrix when the determination condition is not satisfied for the target pixel.

According to another aspect, the present invention provides a non-transitory computer readable storage medium storing a set of program instructions installed on and executed by a computer. The program instructions includes: receiving image data representing an image, the image having a plurality of pixels, the image data having a plurality of pixel values corresponding to the plurality of pixels; specifying an edge pixel based on the image data, the edge pixel representing an edge; setting a target pixel and a reference pixel from among the plurality of pixels, the reference pixel being located out of the edge, the target pixel being located between the edge pixel and the reference pixel; determining whether a determination condition is satisfied for the target pixel, the determination condition indicating that a pixel value of the edge pixel, a pixel value of the target pixel, and a pixel value of the reference pixel monotonically increase in said order; setting a binary value of the target pixel to a first value without using a dither matrix when the determination condition is satisfied for the target pixel; and setting the binary value of the target pixel to one of the first value and a second value different from the first value by using the dither matrix when the determination condition is not satisfied for the target pixel.

BRIEF DESCRIPTION OF THE DRAWINGS

The particular features and advantages of the invention as well as other objects will become apparent from the following description taken in connection with the accompanying drawings, in which:

FIG. 1 is a block diagram showing an image-processing system according to a first embodiment of the present invention;

FIG. 2 is a flowchart illustrating a printing process according to the first embodiment;

FIG. 3(A) is an explanatory diagrams showing an input image;

FIG. 3(B) is an explanatory diagram showing a binary image;

FIG. 3(C) is an explanatory diagram showing a binary image;

DETAILED DESCRIPTION

A. First Embodiment

Figure 4:
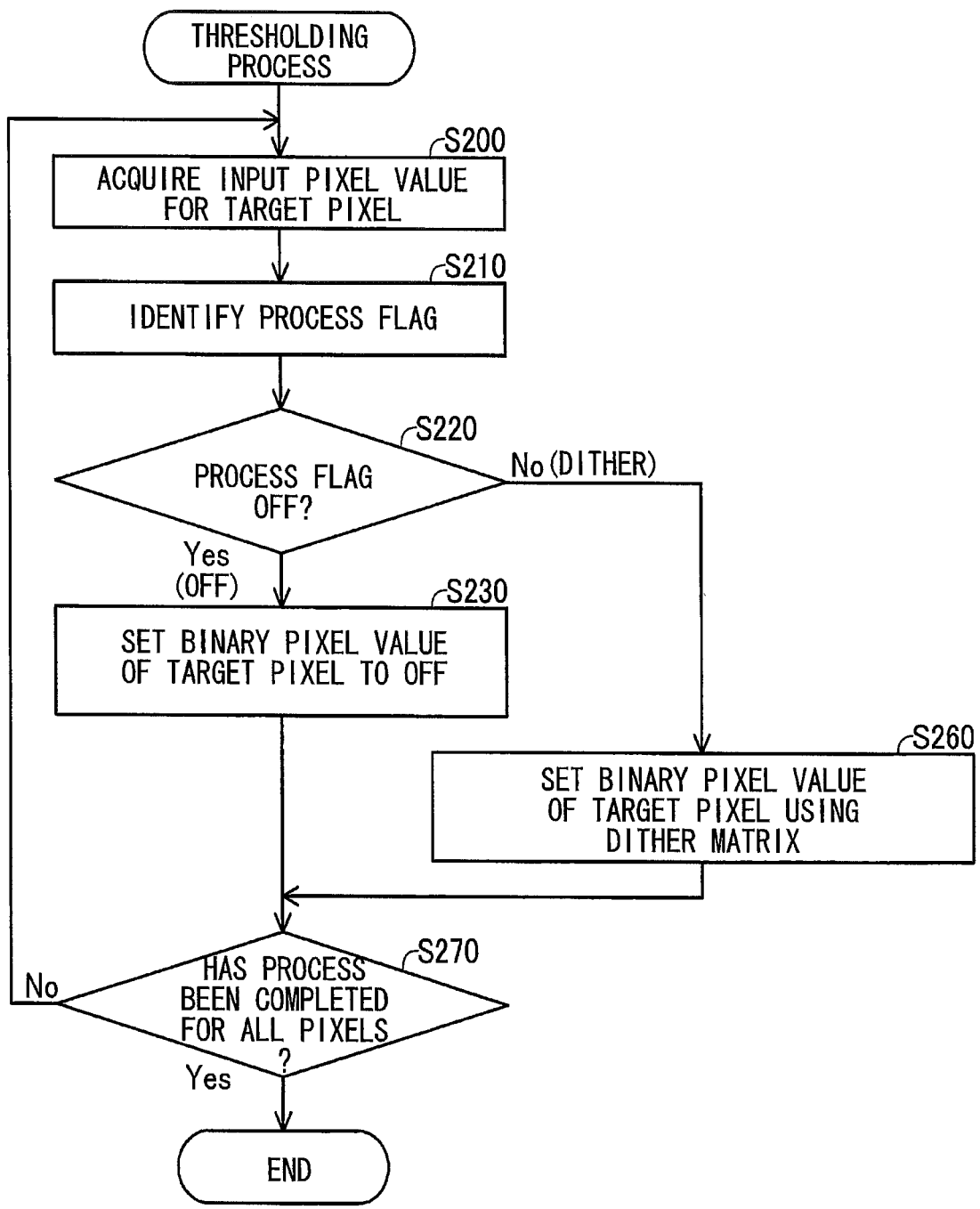
FIG. 4 is a flowchart illustrating a thresholding process according to the first embodiment.

FIG. 1 is a block diagram showing an image-processing system 1000 according to an embodiment of the present invention. The image-processing system 1000 has a network 900, a portable terminal 300, a server 400, and a multifunction peripheral 100. The portable terminal 300, the server 400, and the multifunction peripheral 100 are connected to the network 900. The portable terminal 300 transmits image data IM1 to the server 400 according to instructions from a user. The server 400 generates image data IM2 for printing based on the image data IM1 received from the portable terminal 300 and transmits the image data IM2 to the multifunction peripheral 100. The multifunction peripheral 100 prints images based on the image data IM2 received from the server 400.

The portable terminal 300 is a mobile telephone or a tablet computer, for example. The portable terminal 300 has a data processor 310. The data processor 310 is a computer that possesses a processor (CPU, for example) and a storage device (DRAM and flash memory, for example), both not shown in the drawings. The processor of the data processor 310 executes programs stored in the storage device to implement functions of process units, including a data process unit 320 and a data transmission unit 322. The data process unit 320 acquires the image data IM1 representing an image to be printed according to instructions from the user. For example, the data process unit 320 selects image data produced by an imaging unit (not shown) provided in the portable terminal 300 as the image data IM1 to be printed in response to user instructions. The data transmission unit 322 transmits the image data IM1 to the server 400 via the network 900. The format of the image data IM1 is arbitrary, but may be the JPEG format, for example.

The server 400 has a data processor 410. The data processor 410 is a computer that possesses a processor (CPU, for example) and a storage device (DRAM and hard disk drive, for example), both not shown in the drawings. The processor of the data processor 410 executes programs stored in the storage device to implement functions of process units, including an image data generation unit 420 and a data transmission unit 422. The image data generation unit 420 generates the image data IM2 for executing a printing operation on the multifunction peripheral 100 based on the image data IM1 received from the portable terminal 300. For example, the data processor 410 rasterizes the image data IM1 to produce the image data IM2 in a bitmap format having a predetermined pixel density. The data processor 410 also executes an anti-aliasing process for reducing jagged lines in the image. In the following description, the image data IM2 generated by the image data generation unit 420 will be 300 dpi jpeg data. The data transmission unit 422 transmits the image data IM2 to the multifunction peripheral 100 via the network 900.

The multifunction peripheral 100 includes a processor 110, a volatile storage device 120, a nonvolatile storage device 130, a display unit 140, an operating unit 150, a communication interface 160, and a print execution unit 180.

The processor 110 is a device such as a CPU for performing data processes. The volatile storage device 120 is DRAM, for example. The nonvolatile storage device 130 is flash memory, for example. The nonvolatile storage device 130 stores program s 132 executed by the processor 110, and data representing dither matrices DM. By executing the programs 132, the processor 110 implements various functions. In the first embodiment, the processor 110 implements the functions of such process units as a data acquisition unit 210, a pre-process unit 220, an edge identification unit 230, a threshold process unit 260, and a data output unit 270. These process units will be described later in greater detail.

Note that process units 240, 250, and 280 depicted with dashed lines in FIG. 1 are implemented by the processor 110 in subsequent embodiments. More specifically, the processor 110 implements an object type identification unit 240 in the third embodiment, the object type identification unit 240 and a matrix selection unit 250 in the fourth embodiment, and a command reception unit 280 in the fifth embodiment. The processor 110 also temporarily stores various intermediate data used while executing programs such as the program 132 in storage devices such as the volatile storage device 120 or nonvolatile storage device 130.

The display unit 140 is a device that displays images, such as a liquid crystal display. The operating unit 150 is a device that is operated by the user, such as a touchscreen overlaid on the display unit 140. By operating the operating unit 150, the user can input various instructions, such as a command to perform an image process. The communication interface 160 is an interface for connecting the multifunction peripheral 100 to a network, such as a wireless interface conforming to IEEE 802.11a/b/g/n standards. The communication interface 160 connects to the network 900 in the present example.

The print execution unit 180 is a device that prints images on printing media, such as paper. In the first embodiment, the print execution unit 180 is a color laser printer that prints using toner in the colors cyan (C), magenta (M), yellow (Y), and black (K). However, the print execution unit 180 may be a printer that employs a different system, such as an inkjet printer.

FIG. 2 is a flowchart illustrating steps in a printing process executed by the multifunction peripheral 100. The multifunction peripheral 100 (see FIG. 1) initiates this printing process when image data IM2 is received via the communication interface 160. In S100 at the beginning of the printing process, the data acquisition unit 210 acquires the image data IM2 via the communication interface 160.

In S110 the pre-process unit 220 performs a data conversion process on the image data IM2. The pre-process unit 220 performs this data conversion process to convert the image data IM2 to bitmap data of a pixel density required for the printing process. The bitmap data generated in S110 expresses the color of each pixel (hereinafter called a "print pixel") using tone (or gradation) values (256 levels from 0 to 255, for example) for the three color components red (R), green (G), and blue (B), for example. The tone value for each color component will be called a "pixel value." The bitmap data generated in S110 is 600 dpi data.

In S120 the pre-process unit 220 performs color conversion on the bitmap data. The pre-process unit 220 converts the RGB pixel values for each print pixel to pixel values for the plurality of toner colors (CMYK in the embodiment) using a prescribed lookup table. The pixel value for each toner color is a tone value representing the quantity of toner at each pixel position (the density of color rendered in toner; hereinafter simply called the "colorant tone value"). In the first embodiment, three or more levels (256 levels from 0 to 255, for example) are used as colorant tone values for expressing a density range from 0% to 100%, where 0% denotes a toner quantity of 0 and 100% denotes a prescribed maximum quantity of toner. In the following description, the tone value indicating 0% (0 in the embodiment) is called the "minimum tone value," while the tone value indicating 100% (255 in the embodiment) is called the "maximum tone value." Further, the converted bitmap data produced from the color conversion process is called "input image data," an image rendered by the input image data is called an "input image," and a pixel value expressed by the input image data is called an "input pixel value".

FIG. 3(A) is a schematic diagram showing an example of an input image. The example in FIG. 3(A) shows a portion of an image represented by input pixel values for black. The image in this example represents the characters "dev" in black. Dark-colored areas in the drawing indicate areas with large input pixel values, while light-colored areas indicate areas with small input pixels values. Through the anti-aliasing process performed by the server 400 at the outline of a text character, the input pixel values are made to grow gradually smaller from the inside of the outline toward the outside.

The bottom portion of FIG. 3(A) is an enlarged view of part of the character. The enlarged view includes a plurality of boxes Px representing print pixels. The print pixels Px are arranged in a grid that has rows aligned in a first direction D1 and columns aligned in a second direction D2 orthogonal to the first direction D1. Shading provided in the print pixels Px has different levels of darkness to denote the size of the input pixel values, with darker shading denoting larger input pixel values. The print pixels Px in the enlarged view belong to five pixel columns Ca-Ce extending in the second direction D2. The pixel columns Ca-Ce are arranged sequentially adjacent to each other in the first direction D1.

The enlarged view in FIG. 3(A) depicts part of the outline on the right side of the character "d", and hence part of the outline extending in the second direction D2. The first pixel column Ca and the second pixel column Cb show print pixels representing the character "d", whose input pixel values are relatively large (100%, for example). The fifth pixel column Ce shows print pixels representing background that have relatively small input pixel values (0%, for example). The third pixel column Cc and the fourth pixel column Cd positioned between the above columns show print pixels representing the region adjacent to the outline of the character "d" and have input pixel values set between the input pixel value of the character "d" (100% in this example) and the input pixel value of the background (0% in this example). The input pixel values grow gradually smaller from column to column in the first direction D1, from the second pixel column Cb positioned inside the character "d" to the fifth pixel column Ce positioned outside the character "d". Thus, the outline of the character "d" is rendered using intermediate tones.

FIG. 3(B) is a schematic diagram showing a sample binary image produced from thresholding the input image of FIG. 3(A) using a dither matrix DM. The bottom portion of FIG. 3(B) is a partial enlarged view corresponding to the same area of the character shown in the partial enlarged view of FIG. 3(A). The thresholding process serves to set the pixel value for each print pixel to a binary value (hereinafter called a "binary pixel value") indicating either ON or OFF, where ON indicates that toner is to be deposited at the corresponding print pixel while OFF indicates that toner is not to be deposited. Hence, OFF indicates that the color represented by the binary pixel value is brighter than the binary pixel value ON. Shaded print pixels Px in FIG. 3(B) denote pixels whose binary pixel value is ON (hereinafter called "ON pixels"), while unshaded print pixels Px denote pixels whose binary pixel value is OFF (hereinafter called "OFF pixels").

As shown in FIG. 3(B), a finely textured pattern with minute bumps or irregularities (i.e., a pattern with a scattering of ON pixels) is formed near the outline of the character. Thus, the outline of the character is not smooth. As illustrated in the partial enlarged view, the finely textured pattern appears in the region representing intermediate tones (pixel columns Cc and Cd in this example). This uneven texture that represents intermediate tones is set based on the dither matrix DM.

When areas of intermediate tones are produced near the outlines of text (as well as graphics and other objects) in this way, finely textured patterns may be formed near the outlines. Since these textured patterns do not represent the shape of the object, they can be noticeable and unnatural in appearance. Therefore, in order to suppress the formation of such textured patterns in the first embodiment, the threshold process unit 260 does not use dither matrices DM to perform the thresholding process in areas with intermediate tones near the edges of objects.

In S130 of FIG. 2, the threshold process unit 260 sets a process flag to be used in the thresholding process for each pixel. In the first embodiment, the process flag is set to either "dither" or "off" for each pixel. "Dither" indicates that a dither matrix DM is to be used for setting binary pixel values, while "off" indicates that the binary pixel values are to be set to OFF without using the dither matrix DM. As will be described later, the threshold process unit 260 in the first embodiment sets the process flag to "off" for areas representing intermediate tones near edges of objects, as in the pixel columns Cc and Cd of FIG. 3(A), and sets the process flag to "dither" for all other areas. The process of setting the process flag (process flag setting process) will be described later in greater detail.

In S140 of FIG. 2, the threshold process unit 260 generates binary image data by executing a thresholding process on the input image data. Binary image data includes binary pixel values for all toner colors of each print pixel. In the first embodiment, the threshold process unit 260 sets binary pixel values for black based on process flags, but sets binary pixel values for the other color components (cyan, magenta, and yellow in this example) of all print pixels using dither matrices DM.

FIG. 4 is a flowchart illustrating steps in the thresholding process using process flags. In S200 at the beginning of the process in FIG. 4, the threshold process unit 260 selects, as a target pixel, one of the print pixels in the input image that has not yet been processed and acquires the input pixel value for this target pixel (hereinafter called the "target pixel value"). In S210 the threshold process unit 260 identifies the process flag for the target pixel.

In S220 the threshold process unit 260 determines whether the process flag of the target pixel is "off" When the process flag is "off" (S220: YES), in S230 the threshold process unit 260 sets the binary pixel value of the target pixel to OFF. In the example of FIG. 3(A), the threshold process unit 260 would set the binary pixel value to OFF for target pixels in the pixel columns Cc and Cd. The process subsequently advances to S270.

However, if the process flag is not set to "off" but is set to "dither" (S220: NO), in S260 the threshold process unit 260 sets the binary pixel value for the target pixel using the target pixel value and the dither matrix DM. In the example of FIG. 3(A), the threshold process unit 260 sets the binary pixel value based on the dither matrix DM and the target pixel value for all target pixels in pixel columns Ca, Cb, and Ce. Subsequently, the process advances to S270.

In S270 the threshold process unit 260 determines whether the above process has been completed for all pixels in the input image. If there remain unprocessed pixels (S270: NO), the threshold process unit 260 returns to S200 and repeats the above process with an unprocessed pixel. Once all pixels have been processed (S270: YES), the process of FIG. 4 ends.

FIG. 3(C) is a schematic diagram showing a sample binary image obtained by the thresholding process according to the first embodiment. The example of FIG. 3(C) shows a binary image obtained by binarizing the input image of FIG. 3(A). The bottom portion of FIG. 3(C) is a partial enlarged view for the same region in the enlarged view of FIG. 3(A).

As shown in FIG. 3(C), binary pixel values have been set to ON in pixel columns Ca and Cb representing the character, and have been set to OFF in pixel column Ce representing the background. The binary pixel values in these pixel columns Ca, Cb, and Ce are set using dither matrices DM. Binary pixel values are set to OFF in the pixel columns Cc and Cd representing intermediate tones without using the dither matrix DM. This method suppresses the formation of finely textured patterns, such as that shown in FIG. 3(B).

In S150 of FIG. 2, the data output unit 270 generates print data from the binary image data resulting from the thresholding process, and provides this print data to the print execution unit 180. The print data is simply image data of a format that the print execution unit 180 can interpret. The print data may include commands for the print execution unit 180 in addition to data representing the binary image. The print execution unit 180 prints an image based on the print data received from the data output unit 270.

Figure 5:
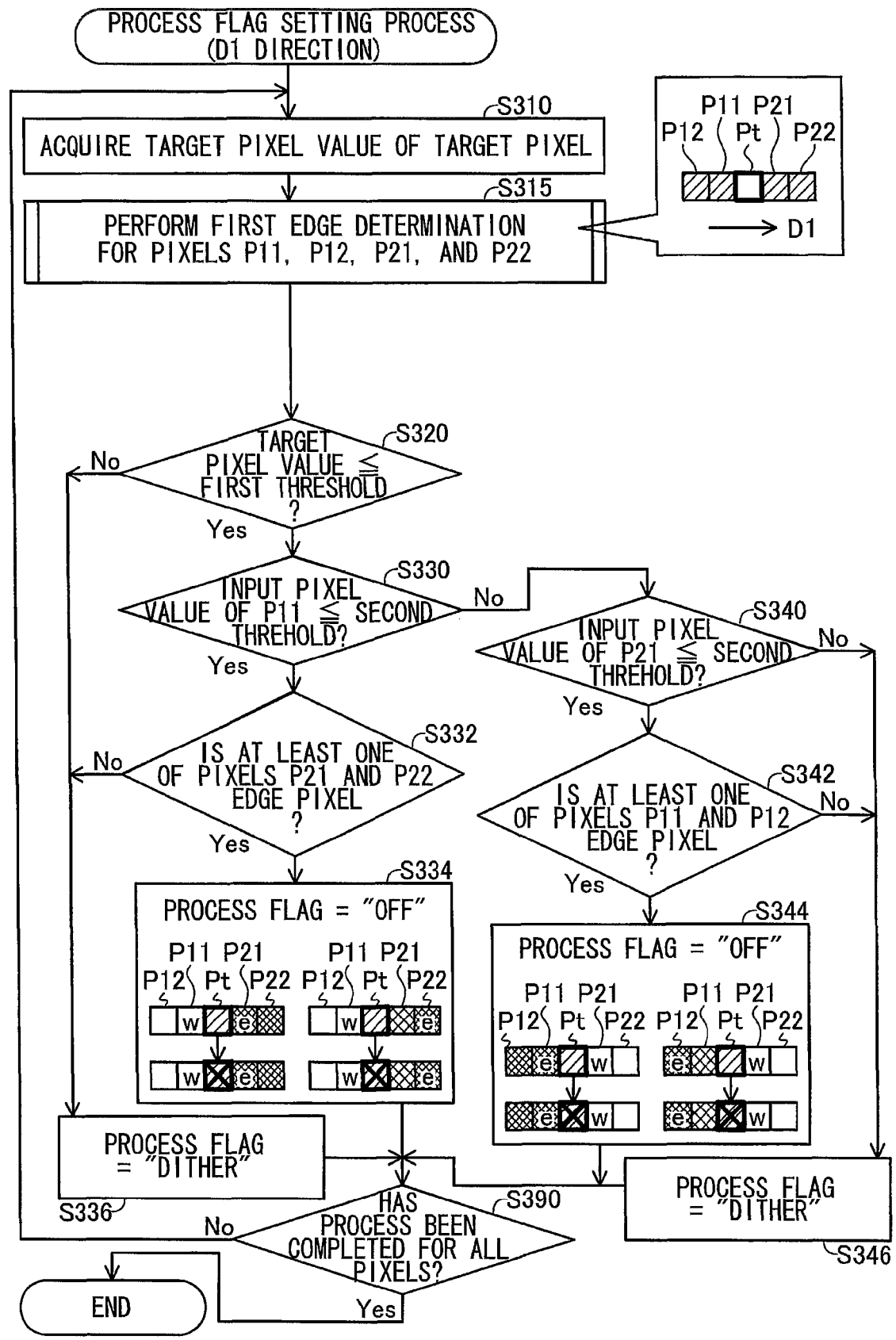
FIG. 5 is a flowchart illustrating a process flag setting process according to the first embodiment.

Next, the process-flag setting process executed in S130 of FIG. 2 will be described. FIG. 5 is a flowchart illustrating steps in the process-flag setting process. In S310 at the beginning of the process in FIG. 5, the threshold process unit 260 selects, as the target pixel, one of the print pixels in the input image that has not yet been processed and acquires the target pixel value of the selected target pixel (the input pixel value for black in this case). In S315 the edge identification unit 230 performs a first edge determination for four pixels neighboring the target pixel by analyzing the input image data. The graphic to the right of step S315 in FIG. 5 shows the target pixel Pt, and four neighboring pixels P11, P12, P21, and P22 that are the subject of the first edge determination. The four pixels P11, P12, P21, and P22 fall on a line extending in the first direction D1 and are centered on and adjacent the target pixel Pt. In this description, the first direction D1 will also be called the "+D1 direction," while the direction opposite the first direction D1 will be called the "−D1 direction." Further, pixels on the −D1 side of the target pixel Pt will be called "front pixels," while pixels on the +D1 side of the target pixel Pt will be called "rear pixels." The two front pixels P11 and P12 are arranged in order from the target pixel Pt in the −D1 direction, and the two rear pixels P21 and P22 are arranged in order from the target pixel Pt in the +D1 direction.

Figure 6:
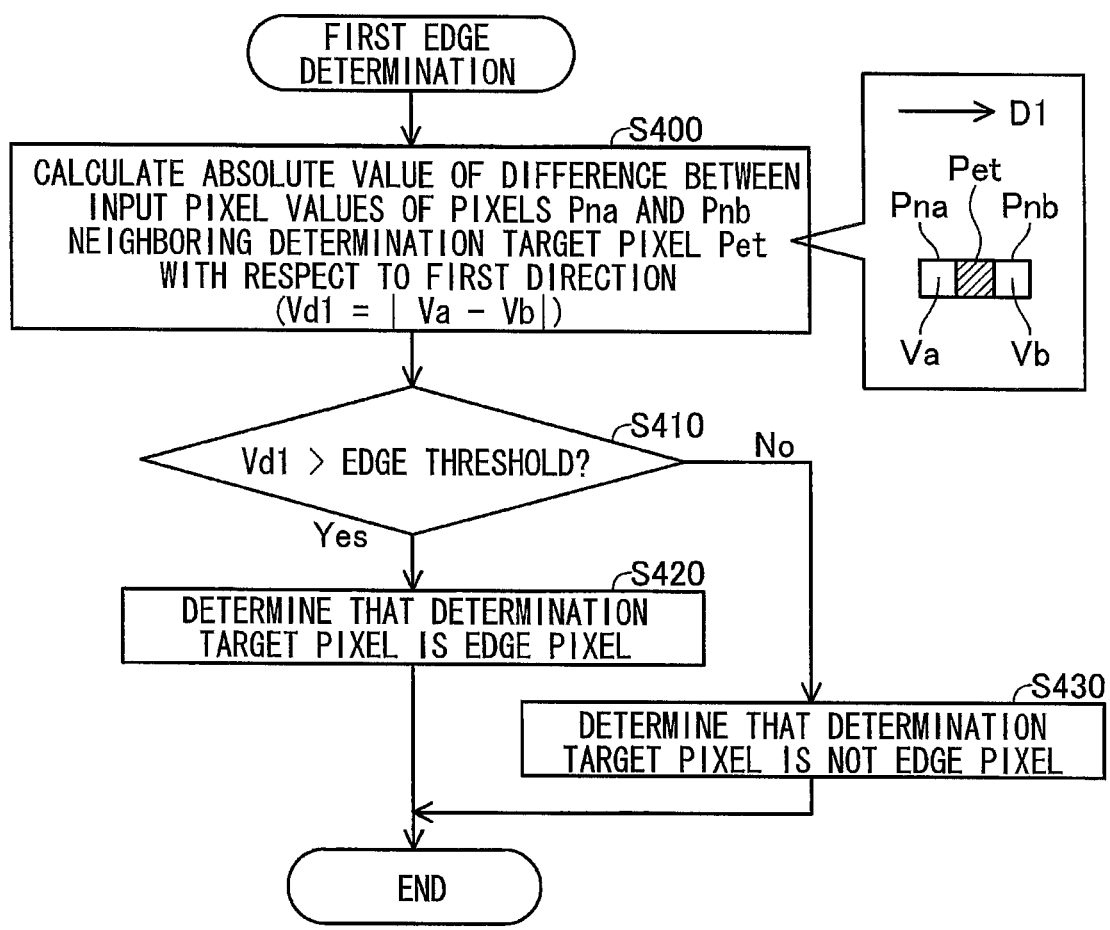
FIG. 6 is a flowchart illustrating a first edge determination according to the first embodiment.

FIG. 6 is a flowchart illustrating steps in the first edge determination. In S400 at the beginning of the process in FIG. 6, the edge identification unit 230 identifies input pixel values Va and Vb for pixels Pna and Pnb neighboring (bordering) opposite sides of a determination target pixel Pet. Here, the determination target pixel Pet is one of the pixels P11, P12, P21, and P22. The first pixel Pna is adjacent to (bordering) the −D1 side of the determination target pixel Pet, while the second pixel Pnb is adjacent to (bordering) the +D1 side of the determination target pixel Pet. The threshold process unit 260 calculates an absolute value VD1 of the difference between the input pixel values Va and Vb (hereinafter called the "absolute difference Vd1"). In S410 the edge identification unit 230 determines whether the absolute difference VD1 is greater than a prescribed edge threshold value. The edge threshold value is set to half the maximum tone value (half of 256; i.e., 128 in the embodiment). If the absolute difference VD1 is greater than the edge threshold value (S410: YES), in S420 the edge identification unit 230 determines that the determination target pixel Pet is an edge pixel and subsequently ends the process in FIG. 6. Using the example in FIG. 3(A), the edge identification unit 230 determines that a pixel in the second pixel column Cb is an edge pixel. However, if the absolute difference VD1 is less than or equal to the edge threshold value (S410: NO), in S430 the edge identification unit 230 determines that the determination target pixel Pet is not an edge pixel, and subsequently ends the process in FIG. 6.

As described above, the edge identification unit 230 determines that the determination target pixel Pet is an edge pixel when the change in input pixel values with respect to the first direction D1 is large. The edge identification unit 230 executes this first edge determination for each of the four pixels P11, P12, P21, and P22 shown in FIG. 5.

In S320 of FIG. 5, the threshold process unit 260 determines whether the target pixel value is less than or equal to a prescribed first threshold value. The first threshold value is set to a value such as 200 to correspond to a maximum input pixel value that can be treated as an intermediate tone. When the target pixel value is greater than the first threshold value (S320: NO), in S336 the threshold process unit 260 sets the process flag to "dither" and advances to S390. In the example of FIG. 3(A), the input pixel value for a print pixel Px in pixel columns Ca and Cb representing the character (the value 256, which represents 100%) is greater than the first threshold value. Accordingly, the threshold process unit 260 sets the process flag for print pixels Px in the pixel columns Ca and Cb to "dither."

If the target pixel value is less than or equal to the first threshold value (S320: YES), in S330 the threshold process unit 260 determines whether the input pixel value for the first front pixel P11 is less than or equal to a second threshold value. The second threshold value is set to a value of 50, for example, that corresponds to an upper limit of an input pixel value that can be treated as a light color, as in the case of background. If the input pixel value for the first front pixel P11 is greater than the second threshold value (S330: NO), in S340 the threshold process unit 260 determines whether the input pixel value for the first rear pixel P21 is less than or equal to the second threshold value. If the input pixel value for the first rear pixel P21 is less than or equal to the second threshold value (S340: YES), in S342 the threshold process unit 260 determines whether at least one of the two front pixels P11 and P12 is an edge pixel. If at least one of the front pixels P11 and P12 is an edge pixel (S342: YES), in S344 the threshold process unit 260 sets the process flag to "off." The process subsequently advances to S390.

The box indicating step S344 in FIG. 5 includes a schematic diagram showing sample input pixel values for the target pixel Pt and the four pixels P11, P12, P21, and P22 when the process flag is set to "off" in S344. Here, darker shading indicates larger input pixel values. The "x" mark included in the target pixel Pt indicates that the process flag is "off" Further, the symbol "e" indicates an edge pixel, while the symbol "w" added to the first rear pixel P21 indicates a light color. Hereinafter, pixels assigned the symbol "w" will be called "light pixels w" to indicate pixels whose input pixel values are less than or equal to the second threshold value.

When the first front pixel P11 is an edge pixel e, the target pixel Pt is sandwiched between an edge pixel e and a light pixel w. In the example of FIG. 3(A), when a pixel in the third pixel column Cc is treated as the target pixel Pt, a pixel in the second pixel column Cb adjacent to (bordering) the target pixel Pt on the −D1 side is an edge pixel e, and a pixel in the fourth pixel column Cd adjacent to (bordering) the target pixel Pt on the +D1 side is a light pixel w. Therefore, the threshold process unit 260 sets the process flag for the target pixel Pt in the third pixel column Cc to "off."

If the second front pixel P12 is an edge pixel e, the target pixel Pt is disposed between the edge pixel e and the light pixel w. In this case, the light pixel w is adjacent to (bordering) the target pixel Pt, while a single pixel is interposed between the edge pixel e and the target pixel Pt. In the example of FIG. 3(A), when a pixel in the fourth pixel column Cd is treated as the target pixel Pt, a pixel in the second pixel column Cb on the −D1 side of the target pixel Pt is an edge pixel e, and a pixel in the fifth pixel column Ce adjacent to (bordering) the target pixel Pt on the +D1 side is a light pixel w. Therefore, the threshold process unit 260 sets the process flag for the target pixel Pt in the fourth pixel column Cd to "off."

If the pixel value of the first rear pixel P21 is greater than the second threshold value (S340: NO) or if neither of the front pixels P11 and P12 is an edge pixel (S342: NO), in S346 the threshold process unit 260 sets the process flag to "dither" and advances to S390.

Thus, through steps S340, S342, and S344, the threshold process unit 260 sets the process flag to "off" for target pixels Pt representing intermediate tones when each of the target pixels is disposed between an edge pixel e and a light pixel w, and is disposed in an area near the edge pixel e. Here, input pixel values in the area grow smaller as position of the pixel shifts in the +D1 direction.

Conversely, through steps S330, S332, and S334, the threshold process unit 260 sets the process flag to "off" for target pixels Pt representing intermediate tones when each of the target pixels is disposed between an edge pixel e and a light pixel w in an area near the edge pixel e. Here, input pixel values in the area grow smaller as position of the pixel shifts in the −D1 direction. Specifically, in S330 the threshold process unit 260 determines whether the input pixel value of the first front pixel P11 is less than or equal to the second threshold value. If the input pixel value of the first front pixel P11 is less than or equal to the second threshold value (S330: YES), in S332 the threshold process unit 260 determines whether at least one of the two rear pixels P21 and P22 is an edge pixel. If at least one of the rear pixels P21 and P22 is an edge pixel (S332: YES), in S334 the threshold process unit 260 sets the process flag to "off." Thereafter, the process advances to S390. However, if the threshold process unit 260 determines that neither of the rear pixels P21 and P22 is an edge pixel (S332: NO), in S336 the threshold process unit 260 sets the process flag to "dither" and advances to S390.

The box indicating step S334 in FIG. 5 includes a schematic diagram showing sample input pixel values for the target pixel Pt and the four pixels P11, P12, P21, and P22 when the process flag is set to "off" in S334. When the first rear pixel P21 is an edge pixel e, the target pixel Pt is sandwiched between an edge pixel e and a light pixel w. If the second rear pixel P22 is an edge pixel e, the target pixel Pt is disposed between the edge pixel e and the light pixel w, but in this case, only the light pixel w is adjacent to (bordering) the target pixel Pt, while a single pixel is interposed between the edge pixel e and the target pixel Pt.

In S390 the threshold process unit 260 determines whether the above process has been completed for all pixels in the input image. If there remain unprocessed pixels (S390: NO), the threshold process unit 260 returns to S310 and repeats the above process on an unprocessed pixel. Once the process has been completed for all pixels (S390: YES), the process of FIG. 5 ends.

As described above, the threshold process unit 260 selects for each print pixel a process to be used for setting the binary pixel value for that pixel (S320, S330, S332, S340, and S342 in FIG. 5) from between a process for setting the binary pixel value using a dither matrix (S260 of FIG. 4; S336 and S346 of FIG. 5) and a process for setting the binary pixel value to a prescribed value (S230 of FIG. 4; S334 and S344 of FIG. 5). Hereinafter, a thresholding process that combines the process for setting binary pixel values using dither matrices and a process for setting binary pixel values to prescribed values will be called a "compound thresholding process."

In the first embodiment described above, a pixel disposed at a position one or two pixels from an edge pixel e in the direction +D1 or the direction −D1 is a candidate for a target pixel Pt whose process flag (i.e., binary pixel value) can be set without using the dither matrix DM (S332 and S342 of FIG. 5). Hereinafter, the position of a candidate target pixel Pt relative to the edge pixel e, i.e., the first and second positions from the edge pixel e will be called a "first relative position." Further, a pixel disposed adjacent to (bordering) the target pixel Pt on the opposite side of the target pixel Pt from the edge pixel e is a candidate for a light pixel w (hereinafter also called a "reference pixel"). Hereinafter, the position of a reference pixel relative to an edge pixel e will be called a "second relative position."

The following two conditions must be satisfied in order for the process flag (i.e., the binary pixel value) of a target pixel Pt to be set to "off" (hereinafter called "off-setting conditions").

First condition: the target pixel value of a target pixel Pt in the first relative position must be less than or equal to the first threshold value (S320: YES and (S332: YES or S342: YES))
Second condition: the input pixel value of a reference pixel disposed in the second relative position must be less than or equal to the second threshold value ((S330: YES and S332: YES) or (S340: YES and S342: YES))

If any one of the first and second conditions is not satisfied, the threshold process unit 260 sets the process flag for the target pixel Pt to "dither" (i.e., the binary pixel value is determined using the dither matrix DM). As described above for the example in FIG. 3(C), the process of the embodiment suppresses a drop in image quality caused by dither matrices DM.

A reference pixel, which is a candidate for a light pixel w, is a pixel adjacent to (bordering) the target pixel Pt. Therefore, the process of the embodiment can suppress a drop in image quality caused by the dither matrices DM at pixels adjacent to a reference pixel. A reference pixel may also be a pixel separated from the target pixel Pt. For example, the reference pixel may be the $L^{th}$ pixel from the target pixel Pt (where L is an integer of 2 or greater) in a direction opposite the direction toward the edge pixel e.

Further, target pixels Pt whose process flag can be set to "off" indicating the dither matrix DM is not used include pixels adjacent to (bordering) an edge pixel e (S334 and S344 of FIG. 5). Therefore, the process of the embodiment can suppress a drop in image quality caused by dither matrices DM for pixels adjacent to edge pixels e. Further, target pixels Pt whose process flag can be set to "off" so that a dither matrix DM is not applied thereto include pixels separated from an edge pixel e (S334 and S344 of FIG. 5). Therefore, the process of the embodiment can suppress a drop in image quality caused by dither matrices DM for pixels separated from edge pixels e.

Further, the threshold process unit 260 sets the binary pixel value to "off" rather than "on" when setting the binary pixel value without using a dither matrix DM. Hence, the process of the embodiment can suppress a drop in image quality caused by pixels of a high density being formed near object edges, as in the example of FIG. 3(B).

The input image data expresses an input pixel value for each of the colors cyan, magenta, yellow, and black. In the present embodiment, the threshold process unit 260 executes the compound thresholding process on the input pixel value for black. In this way, the threshold process unit 260 reduces the likelihood of finely textured patterns being formed in black toner, which is more noticeable than artifacts formed in cyan, magenta, or yellow. Further, the threshold process unit 260 executes the thresholding process on input pixel values in cyan, magenta, and yellow using dither matrices DM but not process flags. Hence, the threshold process unit 260 can suppress unnatural changes in patterns formed in cyan, magenta, and yellow. However, the compound thresholding process described in the first embodiment may also be employed on one or more of the toner colors cyan, magenta, and yellow, in addition to black (or instead of black).

B. Second Embodiment

Figure 7:
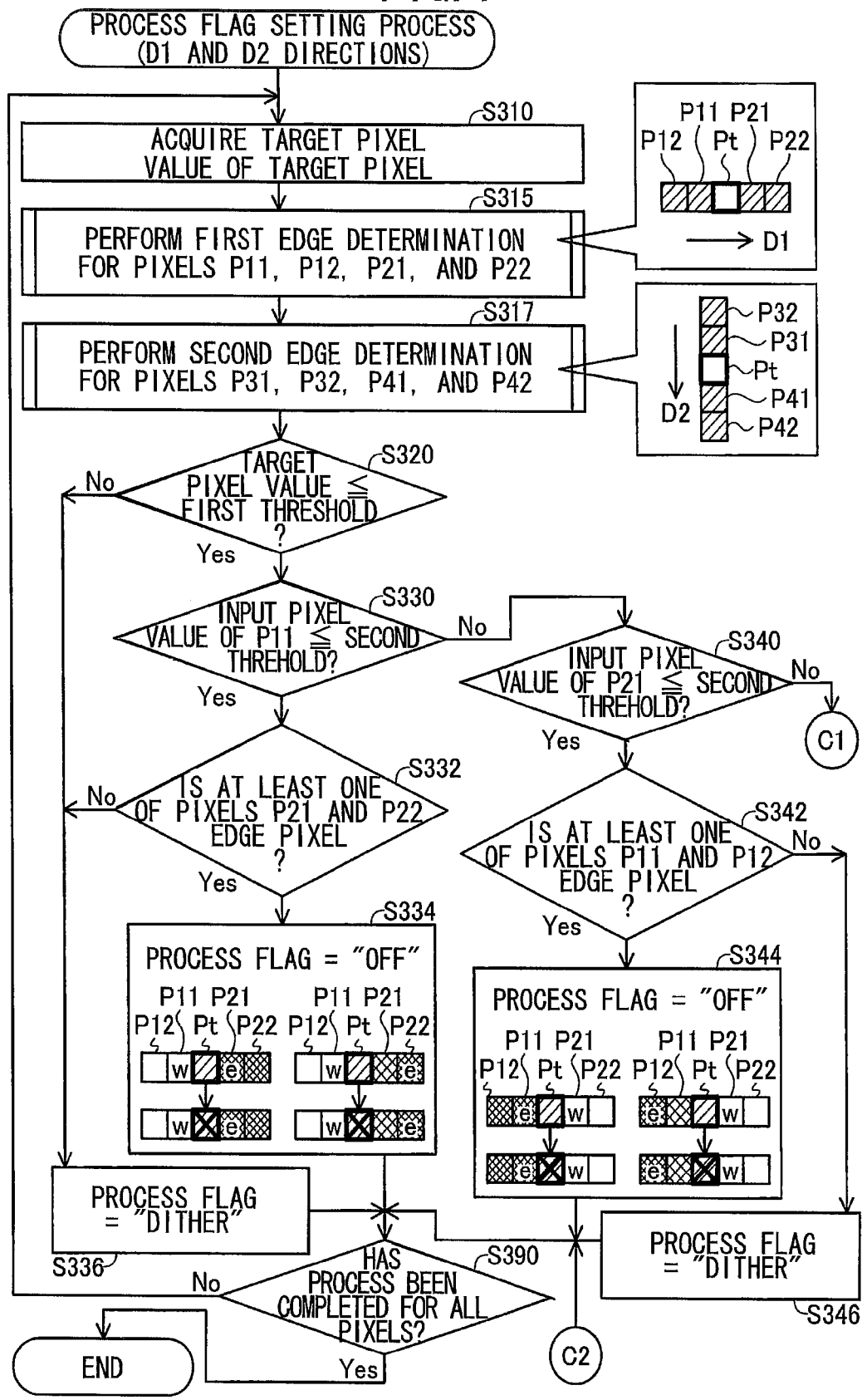
FIG. 7 is a flowchart illustrating a part of a process flag setting process according to a second embodiment.
Figure 8:
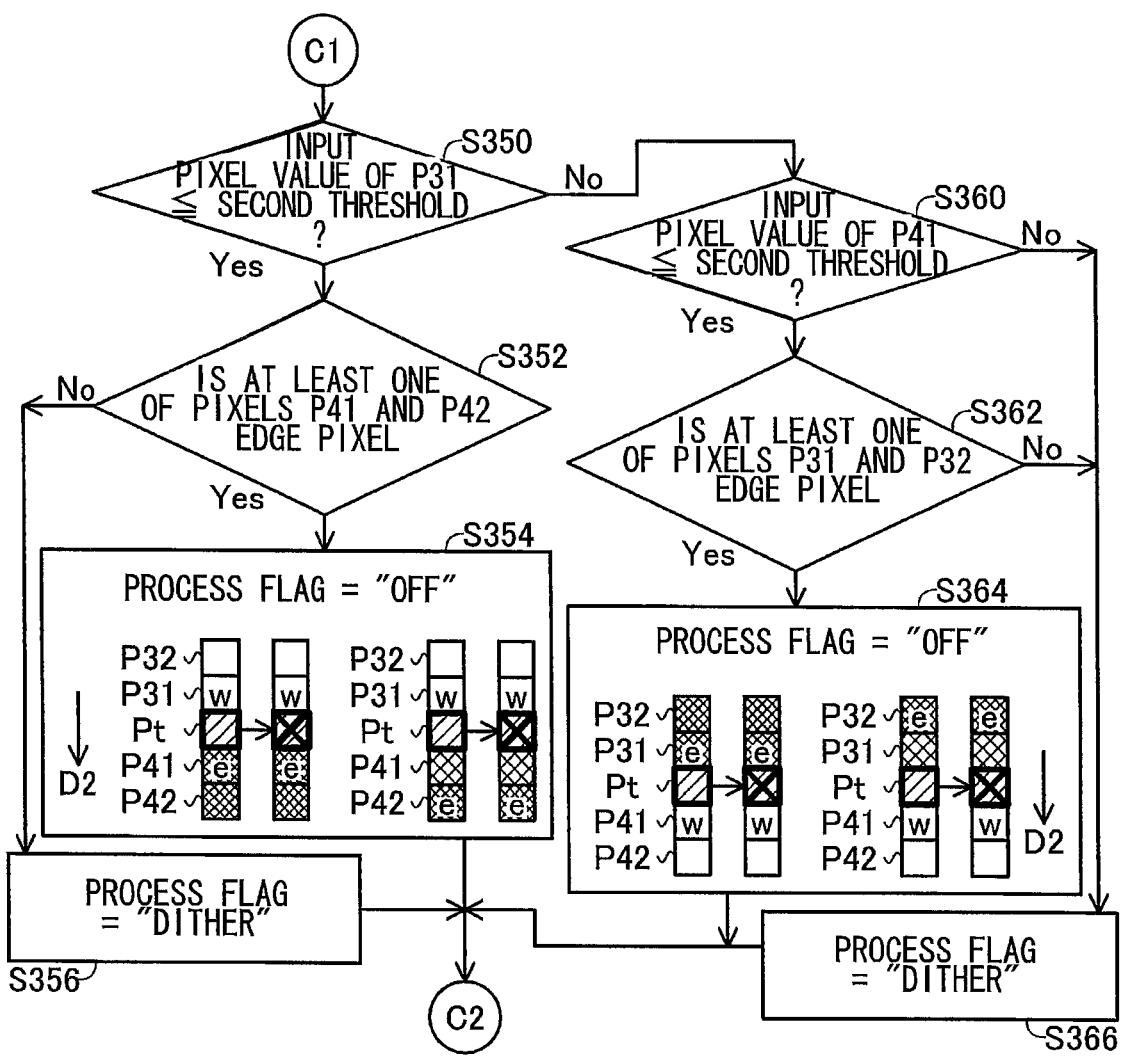
FIG. 8 is a flowchart illustrating a remaining part of a process flag setting process according to the second embodiment.

FIGS. 7 and 8 are flowcharts illustrating steps in a process-flag setting process according to a second embodiment. The process shown in FIGS. 7 and 8 can be used in place of the process shown in FIG. 5. In the process-flag setting process according to the second embodiment, the threshold process unit 260 sets the process flag to "off" not only in areas of intermediate tones near edges of objects in which the input pixel values change greatly in the first direction D1 (i.e., edges extending in a direction intersecting the first direction D1), but also in areas of intermediate tones near edges where input pixel values change greatly in the second direction D2. The hardware structure in the second embodiment is identical to the structure of the image-processing system shown in FIG. 1. Further, the processes in FIGS. 2 and 4 are also executed in the second embodiment.

The process in FIGS. 7 and 8 incorporates the following modifications to the process in FIG. 5.

Modification B-1: step S317 is added between steps S315 and S320.

Modification B-2: steps S350-S356 and S360-S366 in FIG. 8 are added.

Modification B-3: the process advances to step S350 of FIG. 8 rather than step S346 when the determination result in step S340 is "NO."

Modification B-4: the process advances to step S390 of FIG. 7 after completing steps in FIG. 8.

Steps in FIGS. 7 and 8 that are identical to those in FIG. 5 are designated with the same step numbers to avoid duplicating description.

In the newly added step S317 of FIG. 7, the edge identification unit 230 performs a second edge determination on four pixels P31, P32, P41, and P42 among the five pixels P32, P31, Pt, P41, and P42 that are arranged consecutively in the second direction D2 by analyzing the input image data.

Figure 9:
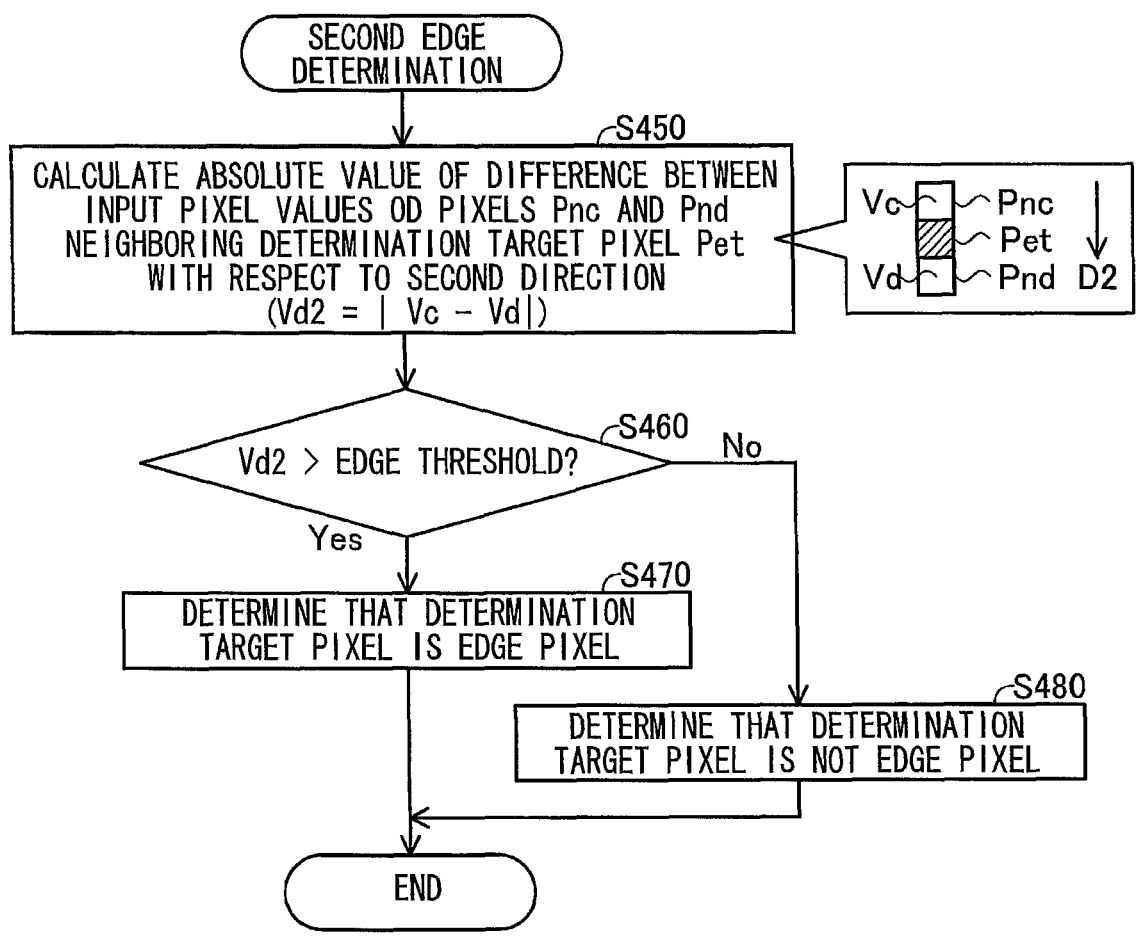
FIG. 9 is a flowchart illustrating a second edge determination according to the second embodiment.

FIG. 9 is a flowchart illustrating steps in the second edge determination executed by the edge identification unit 230. The second edge determination is similar to the first edge determination shown in FIG. 6, except that the determination is made for the second direction D2 rather than the first direction D1. In S450 at the beginning of the process in FIG. 9, the edge identification unit 230 calculates an absolute difference VD2 denoting the absolute value of the difference in pixel values Vc and Vd for two pixels Pnc and Pnd that neighbor the determination target pixel Pet in the −D2 direction and +D2 direction, respectively. If the absolute difference VD2 is greater than the edge threshold value (S460: YES), in S470 the edge identification unit 230 determines that the determination target pixel Pet is an edge pixel. However, if the absolute difference Vd2 is less than or equal to the edge threshold value (S460: NO), in S480 the edge identification unit 230 determines that the determination target pixel Pet is not an edge pixel.

Steps S320, S330-S336, and S340-S346 in FIG. 7 are identical to those with the same step numbers in FIG. 5. Hence, the process according to the second embodiment is performed in areas of intermediate tones near the edges of objects at which the input pixel values change considerably as the position shifts in the direction +D1 or −D1 similarly to the process shown in FIG. 5 of the first embodiment. Steps S350-S356 and S360-S366 in FIG. 8 show the process performed in areas of intermediate tones near edges in which input pixel values change considerably as position shifts in the direction +D2 or −D2.

In steps S350-S356, the threshold process unit 260 applies the same conditions that were applied to pixels P12, P11, Pt, P21, and P22 aligned in the first direction D1 in S330-S336 of FIG. 5 to pixels P32, P31, Pt, P41, and P42 aligned in the second direction D2.

Specifically, if the input pixel value of the first upper pixel P31 is less than or equal to the second threshold value (S350: YES) and if at least one of the lower pixels P41 and P42 is an edge pixel (S352: YES), in S354 the threshold process unit 260 sets the process flag to "off" However, if a negative determination is made in S350 (S350: NO), the process advances to S360. If a positive determination is made in S350 (S350: YES) and if a negative determination is made in S352 (S352: YES), in S356 the threshold process unit 260 sets the process flag to "dither".

The box indicating step S354 in FIG. 8 includes a schematic diagram showing sample input pixel values for the target pixel Pt and the four pixels P31, P32, P41, and P42 when the process flag is set to "off" in S354. The input values gradually decreases in −D2 direction. When the first lower pixel P41 neighboring (bordering) the target pixel Pt is an edge pixel e, the target pixel Pt is sandwiched between an edge pixel e and a light pixel w, and thus the process flag of the target pixel Pt is set to "off". If the second lower pixel P42 is an edge pixel e, the target pixel Pt is disposed between the edge pixel e and the light pixel w, and thus the process flag of the target pixel Pt is set to "off". But in this case, only the light pixel w is adjacent to (bordering) the target pixel Pt, while a single pixel is interposed between the edge pixel e and the target pixel Pt.

In steps S350, S352, and S354 described above, the threshold process unit 260 sets process flags to "off" in areas representing intermediate tones near edges where input pixel values gradually decrease in the −D2 direction.

In steps S360, S362, and S364, the threshold process unit 260 sets the process flag to "off" for a target pixel Pt disposed between an edge pixel e and a light pixel w in an area near the edge pixel e where input values gradually reduces in +D2 direction.

Specifically, if the input pixel value of the first lower pixel P41 is less than or equal to the second threshold value (S360: YES) and if at least one of the upper pixels P31 and P32 is an edge pixel (S362: YES), in S364 the threshold process unit 260 sets the process flag to "off" However, if at least one negative determination is made from among determinations S360 and 362, in S364 the threshold process unit 260 sets the process flag to "dither".

The box indicating step S364 in FIG. 8 includes a schematic diagram showing sample input pixel values for the target pixel Pt and the four pixels P31, P32, P41, and P42 when the process flag is set to "off" in S364. The input values gradually decreases in +D2 direction. When the first upper pixel P31 is an edge pixel e, the target pixel Pt is sandwiched between an edge pixel e and a light pixel w neighboring (bordering) the target pixel Pt, and thus the process flag of the target pixel Pt is set to "off". If the second upper pixel P32 is an edge pixel e, the target pixel Pt is disposed between the edge pixel e and the light pixel w neighboring (bordering) the target pixel Pt, and thus the process flag of the target pixel Pt is set to "off". But in this case, only the light pixel w is adjacent to (bordering) the target pixel Pt, while a single pixel is interposed between the edge pixel e and the target pixel Pt.

In the second embodiment described above, the threshold process unit 260 sets the process flags to "off" (i.e., sets binary pixel values to OFF) not only in areas of intermediate tones near edges of objects in which the input pixel values change greatly in the first direction D1, but also in areas of intermediate tones near edges in which the input pixel values change greatly in the second direction D2. Therefore, in addition to finely textured patterns on the +D1 and −D1 sides of object edges (outlines, for example), the process of the second embodiment can also suppress such finely textured patterns on the +D2 and −D2 sides of object edges.

Similarly to the first embodiment, in the second embodiment, "the first relative position" indicates the position of a candidate target pixel Pt, whose process flag can be set to "off", relative to the edge pixel e. Thus, in the second embodiment, "the first relative position" is a pixel disposed at a position one or two pixels from an edge pixel e in the directions +D1, −D1, +D2, or −D2. Further, similarly to the first embodiment, in the second embodiment, "the second relative position" indicates the position of a reference pixel relative to an edge pixel e. Thus, "the second relative position" indicates a pixel disposed adjacent to (bordering) the target pixel Pt on the opposite side of the target pixel Pt from the edge pixel e.

In the second embodiment, the off-setting conditions in order for the process flag (i.e., the binary pixel value) of a target pixel Pt to be set to "off" are the followings.
First condition: the target pixel value of a target pixel Pt in the first relative position must be less than or equal to the first threshold value (S320: YES and (S332: YES or S342: YES or S352: YES or S362: YES)
Second condition: the input pixel value of a reference pixel disposed in the second relative position must be less than or equal to the second threshold value ((S330: YES and S332: YES) or (S340: YES and S342: YES) or (S350: YES and S352: YES) or (S360: YES and S362: YES))

C. Third Embodiment

Figure 10:
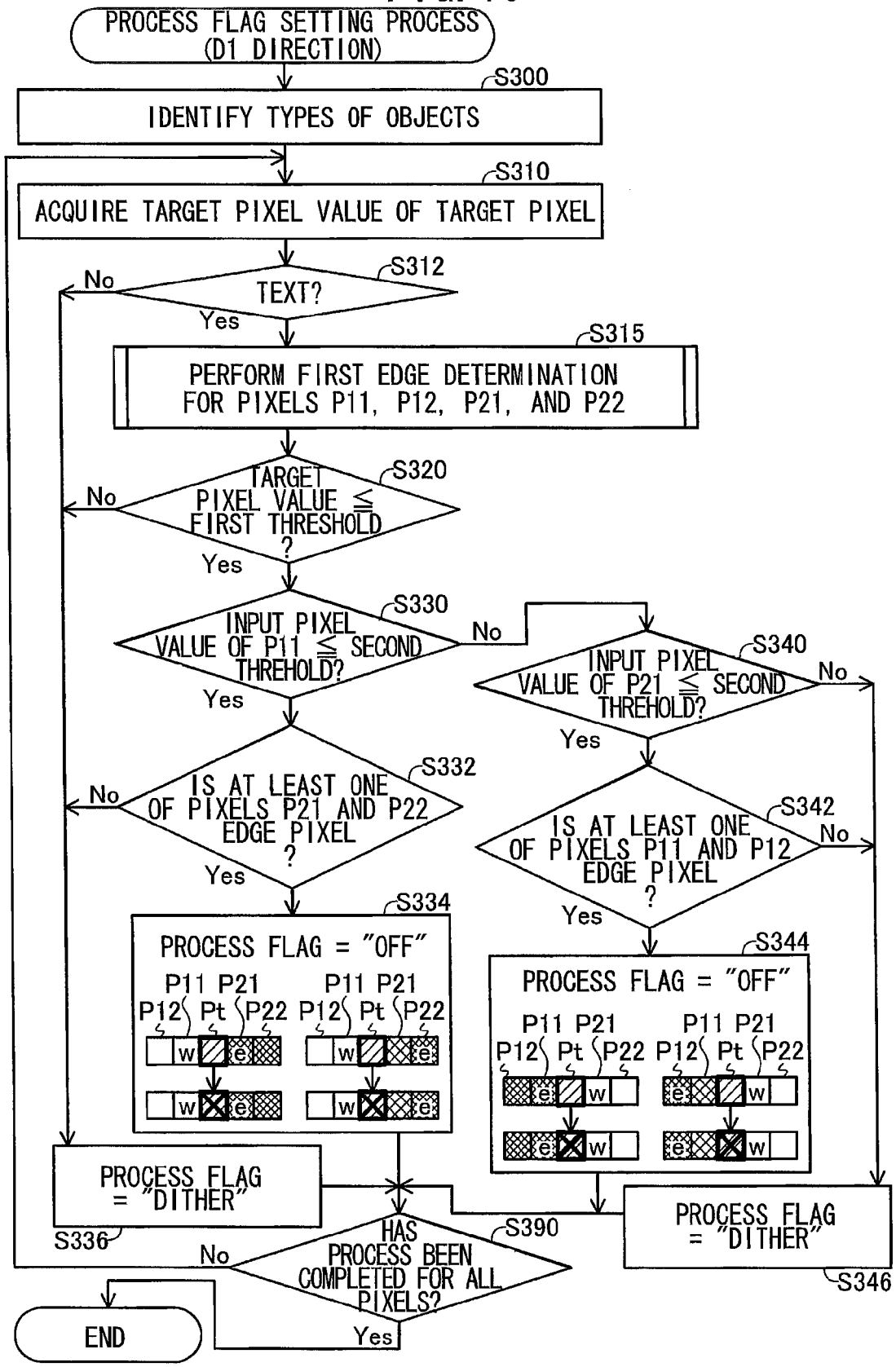
FIG. 10 is a flowchart illustrating a process flag setting process according to a third embodiment.

FIG. 10 is a flowchart illustrating steps in a process-flag setting process according to a third embodiment. The process shown in FIG. 10 can be used in place of the process shown in FIG. 5. In the process-flag setting process according to the third embodiment, the threshold process unit 260 determines whether to perform the compound thresholding process based on the types of objects rendered by the print pixels. The hardware structure used for the printing process in the third embodiment is identical to the structure of the image-processing system 1000 shown in FIG. 1, except that the processor 110 implements the object type identification unit 240 in the third embodiment. Further, the processes in FIGS. 2 and 4 are also executed in the third embodiment.

The process in FIG. 10 incorporates the following modifications to the process in FIG. 5.
Modification C-1: step S300 is added before step S310.
Modification C-2: step S312 is added between steps S310 and S315.

Steps in FIG. 10 that are identical to those in FIG. 5 are designated with the same step numbers to avoid duplicating description.

Figure 11:
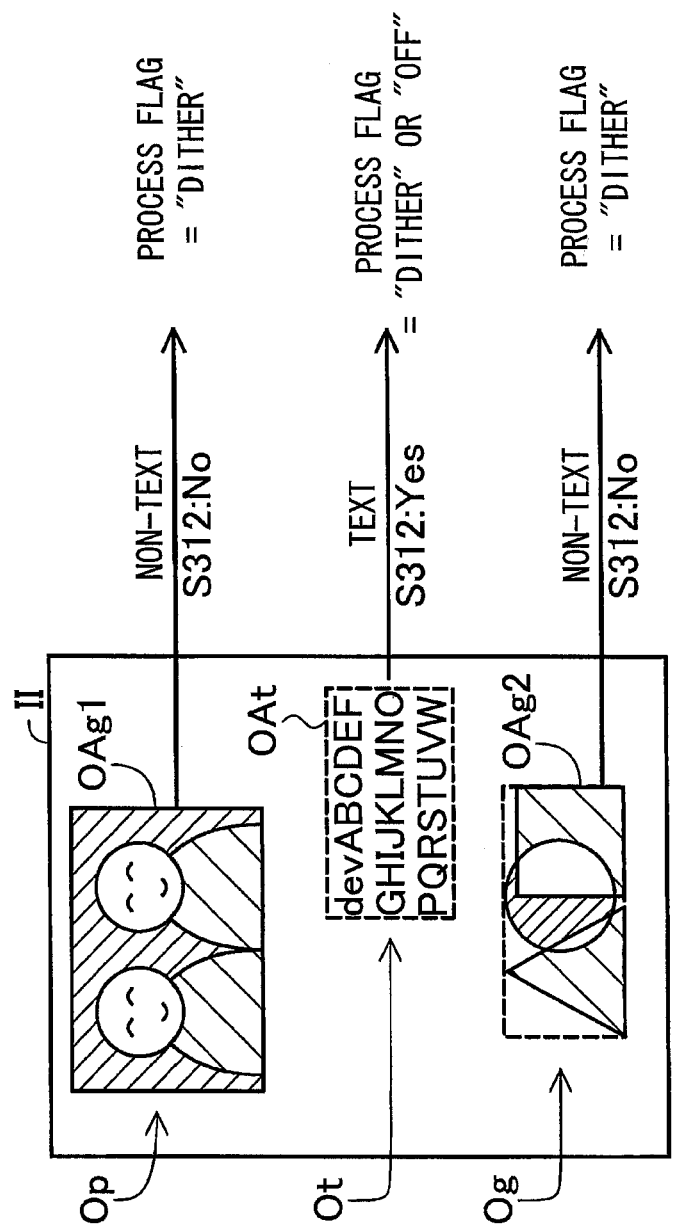
FIG. 11 is an explanatory diagram illustrating a relation between an object type and a process flag.

In S300 at the beginning of the process in FIG. 10, the object type identification unit 240 extracts an object region from the input image for each object type. In the third embodiment, the object type identification unit 240 specifically extracts a text region representing text and a non-text region representing all object images other than text, as the object regions representing objects. Images other than text whose representative regions are extracted as non-text regions may be photos, illustrations, and graphs, for example. FIG. 11 shows a sample input image II. The input image II in FIG. 11 represents a photo Op, a character string Ot, and an illustration Og. By analyzing the input image II, the object type identification unit 240 extracts a first non-text region OAg1, which is the image region representing the photo Op; a text region OAt, which is the region representing the character string Ot; and a second non-text region OAg2, which is the region representing the illustration Og. In S300, the object type identification unit 240 may firstly extract object regions and subsequently identifies object types of the extracted object regions.

Any well-known method may be used to extract an object region for each object type. For example, the object type identification unit 240 may divide the input image into a plurality of process regions (rectangular regions, for example) and calculate the variance of input pixel values (input pixel values for black, for example) in each process region. The object type identification unit 240 then classifies a process region as "text" when the variance of the region is less than a prescribed threshold (hereinafter called a "text threshold") and classifies a process region as "non-text" when the variance of the region is greater than the text threshold. Contiguous process regions of the same type are extracted as a single object region. At this time, the object type identification unit 240 excludes process regions from consideration as object regions when the input pixel values for all pixels in the region are the minimum tone value. Note also that data other than variance may be used to extract object regions. It is also possible to combine various data in order to extract an object region for each of a plurality of object types.

In S312 of FIG. 10, the threshold process unit 260 determines whether the type of the object region that includes the target pixel is "text." If the type of the object region is not "text" (S312: NO), in S336 the threshold process unit 260 sets the process flag to "dither" and advances to S390. When the type of the object region is "text" (S312: YES), the threshold process unit 260 advances to S315. From S315 the threshold process unit 260 performs the same process described in the first embodiment.

As in the first embodiment described with reference to FIG. 5, in the third embodiment described above the threshold process unit 260 sets the process flag for each print pixel in the text region to either "off" or "dither" based on certain conditions (i.e., executes the compound thresholding process). This process can reduce the blurred or indistinct appearance of text. The threshold process unit 260 also executes a thresholding process using dither matrices DM on all print pixels in non-text regions, reducing the likelihood of non-text objects such as photos and illustrations from appearing unnatural in the printed results. A user attempts to recognize detailed shapes in text objects more so than in other types of objects in order to recognize characters. Therefore, finely textured patterns along the edges of characters are more noticeable than finely textured patterns along the edges of other objects. For this reason, text regions are subjected to the compound thresholding process in the third embodiment.

In addition to the first and second conditions described in the first embodiment, the following third condition must be satisfied in the third embodiment as part of the off-setting conditions for setting the process flag (i.e., the binary pixel value) for a target pixel Pt to "off."

Third condition: the type of object represented by the target pixel Pt must be a specific type (text, in this example; S312: YES).

D. Fourth Embodiment

Figure 12:
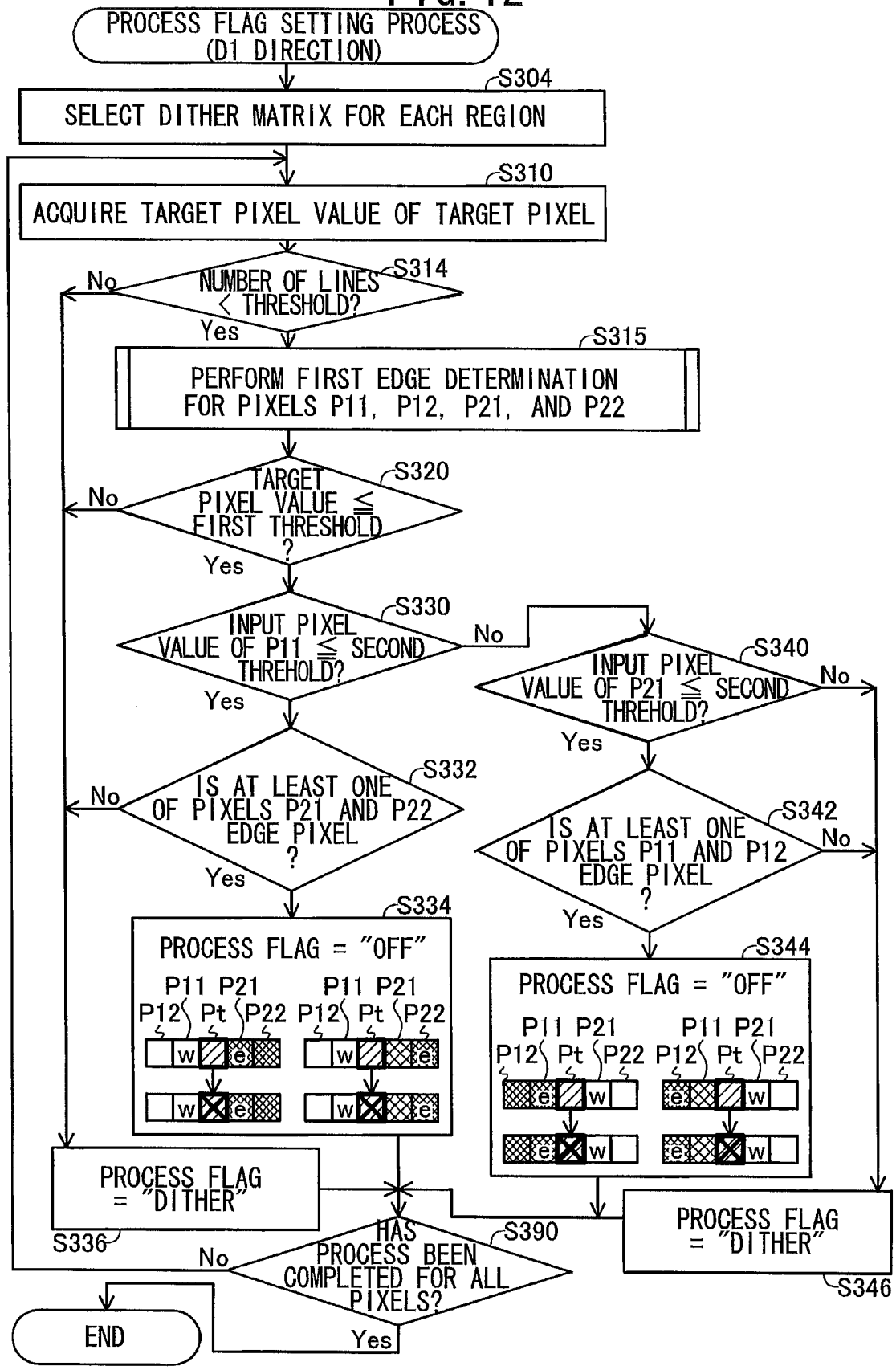
FIG. 12 is a flowchart illustrating a process flag setting process according to a fourth embodiment.

FIG. 12 is a flowchart illustrating steps in a process-flag setting process according to a fourth embodiment. The process shown in FIG. 12 can be used in place of the process shown in FIG. 5. In the fourth embodiment, the threshold process unit 260 is capable of using a plurality of differing dither matrices. The dither matrices may differ from each other in their numbers of lines, for example. The threshold process unit 260 determines whether or not to perform the compound thresholding process based on the dither matrix to be used in the process. The hardware structure used for the printing process in the fourth embodiment is identical to the structure of the image-processing system 1000 shown in FIG. 1, except that the processor 110 implements the object type identification unit 240 and the matrix selection unit 250 in the fourth embodiment. Further, the processes in FIGS. 2 and 4 are also executed in the fourth embodiment. The number of lines denotes what is called "screen ruling." Screen ruling is a measure of printing resolution and is equivalent to the number of lines per unit length that can be rendered with ON pixels (units are in lines per inch (LPI)).

The process in FIG. 12 incorporates the following modifications to the process in FIG. 5.

Modification D-1: step S304 is added before step S310.
Modification D-2: step S314 is added between steps S310 and S315.

Steps in FIG. 12 that are identical to those in FIG. 5 are designated with the same step numbers to avoid duplicating description.

In S304 the object type identification unit 240 extracts an object region from the input image for each object type. The matrix selection unit 250 selects a dither matrix based on the object type for each object region.

Figure 13:
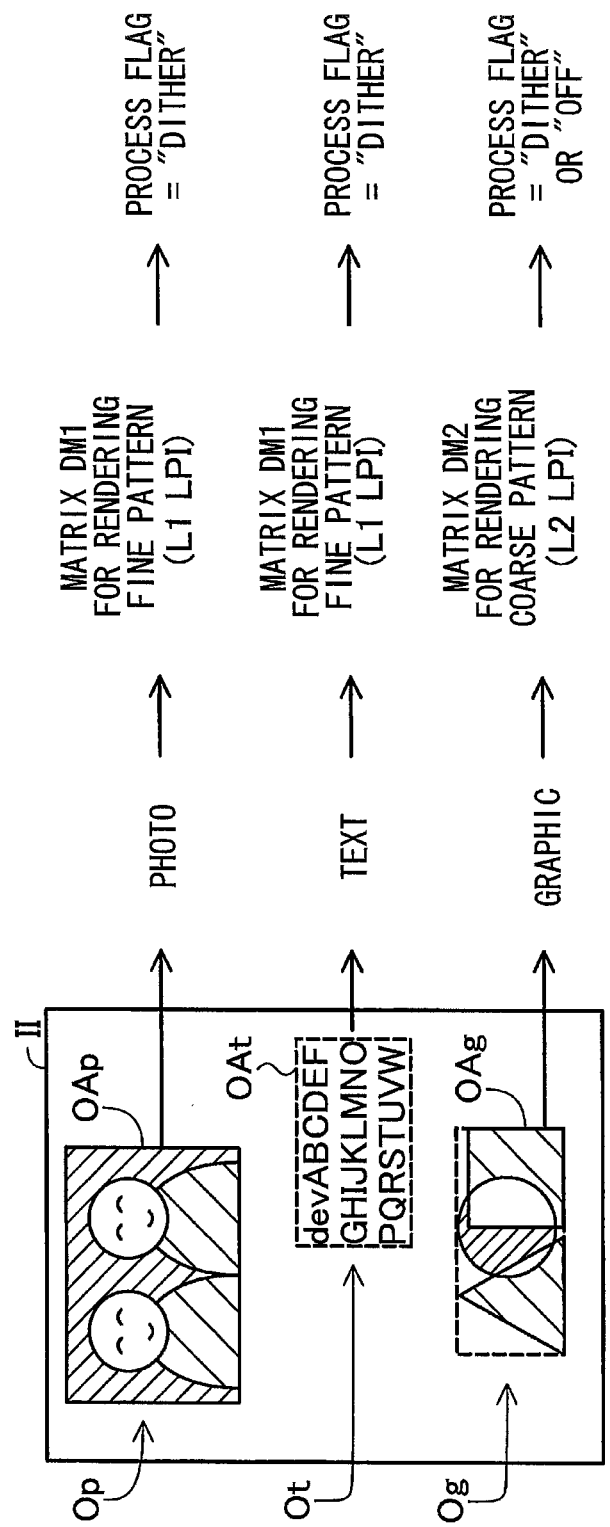
FIG. 13 is an explanatory diagram illustrating a relation among an object type, a process flag, and a dither matrix.

FIG. 13 is a schematic diagram showing a sample input image, the object regions extracted from that input image, and the dither matrices selected for the object regions. The input image II is identical to the input image II in FIG. 11. As in the third embodiment described with reference to FIG. 11, in the fourth embodiment the object type identification unit 240 extracts text regions and non-text regions, but in the fourth embodiment non-text regions are further subdivided into photo regions representing photos and graphic regions representing graphics. Graphics are images other than text and photos and may include illustrations, tables, charts such as histograms and pie charts, diagrams, and patterns. In the example of FIG. 13, the object type identification unit 240 analyzes the input image II and extracts a photo region OAp representing the photo Op, a text region OAt representing the character string Ot, and a graphic region OAg representing the illustration Og.

Any well-known method may be used to extract photo regions and graphic regions. For example, the following method modified the method to extract the object shown in FIG. 10 can be used. That is, the object type identification unit 240 may divide the input image into a plurality of process regions (rectangular regions, for example) and calculate the variance of input pixel values (input pixel values for black, for example) in each process region. The object type identification unit 240 then classifies a process region as "text" when the variance of the region is less than the text threshold, classifies a process region as "photo" when the variance of the region is greater than a prescribed threshold ("photo threshold" that is larger than the text threshold), and classifies a process region as "graphic" when the variance of the region is greater than or equal to the text threshold and less than or equal to the photo threshold.

The matrix selection unit 250 selects a dither matrix for each object region based on the type of object in the object region. In the fourth embodiment, the process shown in FIG. 4 is executed as the first embodiment. However, in S260 of the fourth embodiment, the threshold process unit 260 sets the binary pixel value of the target pixel using the dither matrix selected by the matrix selection unit 250 to be used for the object region that includes the target pixel.

In the fourth embodiment, the matrix selection unit 250 selects a dither matrix from among a first dither matrix DM1 with a first line number L1 as a screen ruling, and a second dither matrix DM2 having a second line number L2, as a screen ruling, that is smaller than the first line number L1. Data representing these dither matrices DM1 and DM2 is stored in the nonvolatile storage device 130. Here, each of the first and second line numbers L1 and L2 indicates the screen ruling. The first dither matrix DM1 can render relatively fine patterns in a toner image, and the second dither matrix DM2 can render relatively coarse patterns in a toner image. The matrix selection unit 250 selects the first dither matrix DM1 when the object type is "photo" or "text" because the finer first dither matrix DM1 is more suitable for printing detailed shapes found in photos and text. The matrix selection unit 250 selects the coarser second dither matrix DM2 when the object type is "graphics." The coarser second dither matrix DM2 can suppress the formation of moiré due to positional shifts in toner images or the like when printing large solid regions (regions of uniform color) that are more common in graphics, such as illustrations and bar graphs, than in text and photos. Banding and other printing artifacts are more noticeable in such solid regions. For this reason, the matrix selection unit 250 in the fourth embodiment selects a coarser dither matrix for graphics than for text and photos, thereby suppressing a drop in image quality in solid regions.

In S314 of FIG. 12, the threshold process unit 260 determines whether the number of lines in the dither matrix applied to the object region that includes the current target pixel is less than a prescribed threshold. In the fourth embodiment, the first line number L1 of the first dither matrix DM1 is 200 LPI, while the second line number L2 of the second dither matrix DM2 is 150 LPI. The threshold value is set to 180 LPI. In this example, the determination in S314 is identical to determining whether the dither matrix is the second dither matrix DM2.

If the dither matrix is not the second dither matrix DM2 (S314: NO), the threshold process unit 260 sets the process flag to "dither" in S336 and advances to S390. If the dither matrix is the second dither matrix DM2 (S314: YES), the threshold process unit 260 advances to S315. The process from S315 is identical to that described in the first embodiment with reference to FIG. 5.

Coarsely textured patterns in the toner image may be formed in areas with intermediate tones when using the coarse second dither matrix DM2. Thus, the threshold process unit 260 in the fourth embodiment sets the process flag for each print pixel in areas at which the coarse second dither matrix DM2 was applied to "off" or "dither" (i.e., executes the compound thresholding process) according to the same conditions described with reference to FIG. 5. In this way, the threshold process unit 260 prevents coarse textured patterns from becoming noticeable. Further, the threshold process unit 260 executes the thresholding process with the first dither matrix DM1 on all print pixels in areas for which the finer first dither matrix DM1 was selected, thereby reducing the potential for objects appearing unnatural in the printed results.

In the fourth embodiment, the off-setting conditions for which the process flag (i.e., the binary pixel value) of the target pixel Pt is set to "off" include the first and second conditions described in the first embodiment, as well as the following fourth condition.

Fourth condition: the dither matrix selected for the thresholding process of the target pixel Pt must be a specific dither matrix (the coarse second dither matrix DM2 in this example; S314: YES).

E. Fifth Embodiment

Figure 14:
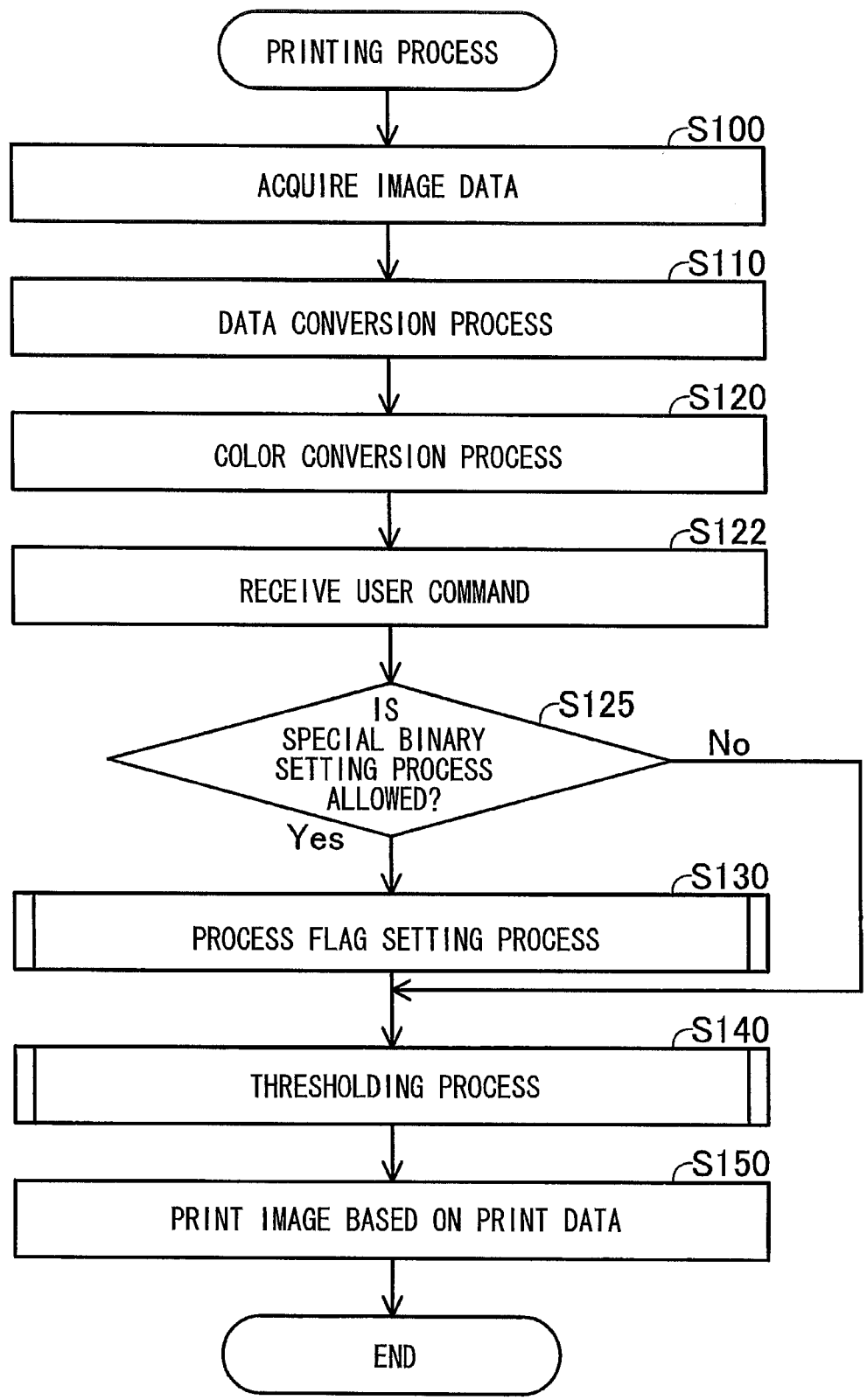
FIG. 14 is a flowchart illustrating a printing process according to a fifth embodiment.

FIG. 14 is a flowchart illustrating steps a printing process according to a fifth embodiment. The process shown in FIG. 14 can be used in place of the process shown in FIG. 2. In the printing process according to the fifth embodiment, the threshold process unit 260 determines whether to perform the compound thresholding process based on an instruction from the user. The hardware structure used for the printing process in the fourth embodiment is identical to the structure of the image-processing system 1000 shown in FIG. 1, except that the processor 110 implements the command reception unit 280. Further, the process in FIG. 4 is also executed in the fifth embodiment. The process-flag setting process in the fifth embodiment may be any of the various processes described above in the first through fourth embodiments or a process-flag setting process according to the sixth embodiment described later.

The process in FIG. 14 incorporates the following modifications to the process in FIG. 2.

Modification E-1: step S122 is added subsequent to step S120.

Modification E-2: step S125 is added subsequent to step S122.

Steps in FIG. 14 that are identical to those in FIG. 2 are designated with the same step numbers to avoid duplicating description.

In S122 the command reception unit 280 receives a user command inputted through the operating unit 150. This command indicates whether the user gives permission to perform a process to set binary pixel values without the use of dither matrices for pixels that satisfy special conditions (hereinafter called a "special binary setting process"). Allowance of the special binary setting process denotes allowance of a compound thresholding process that includes the special binary setting process. In S125 the threshold process unit 260 determines whether the user command indicates allowance of the special binary setting process. If the user command allows for the special binary setting process (S125: YES), then the threshold process unit 260 executes the process-flag setting process in S130 before advancing to S140. If the user command does not give permission to perform the special binary setting process (S125: NO), then the threshold process unit 260 skips step S130 and advances directly to S140. When S130 is skipped, the threshold process unit 260 executes thresholding processes with the process flag set to "dither" for all print pixels.

In the fifth embodiment described above, the threshold process unit 260 determines whether to perform the special binary setting process (i.e., the compound thresholding process) based on a user command. Thus, the threshold process unit 260 implements a thresholding process suited to the user's wishes.

In the fifth embodiment described above, the off-setting conditions for setting the process flag (i.e., binary pixel value) of a target pixel Pt to "off" includes the following fifth condition.

Fifth condition: the user command must indicate an allowance for the special binary setting process (S125: YES).

For example, when employing the process-flag setting process of the first embodiment (see FIG. 5), the off-setting conditions include the first and second conditions described in the first embodiment, as well as the fifth condition described above.

F. Sixth Embodiment

Figure 15:
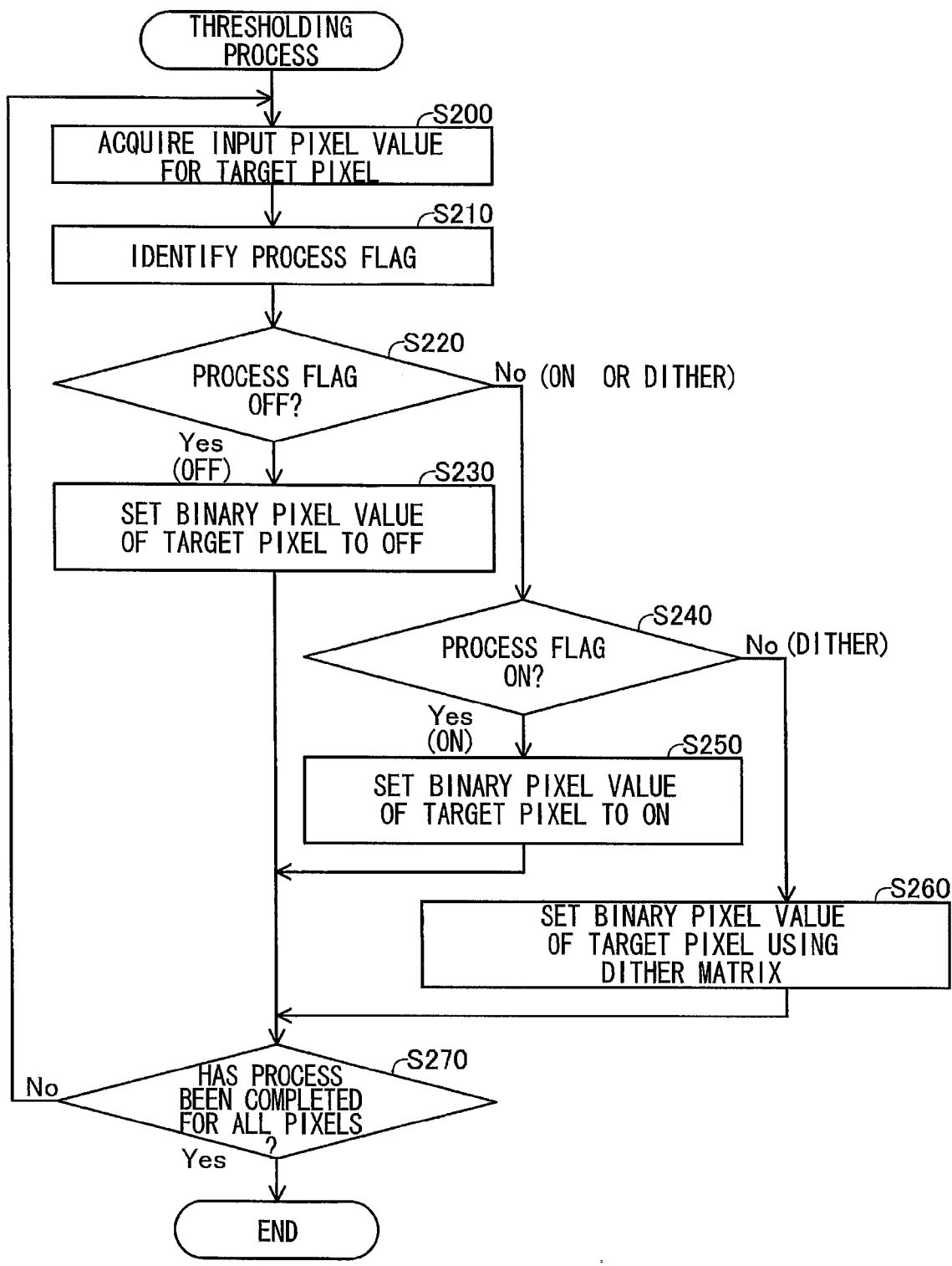
FIG. 15 is a flowchart illustrating a thresholding process according to a sixth embodiment.

FIG. 15 is a flowchart illustrating steps in a thresholding process according to a sixth embodiment. The process shown in FIG. 15 can be used in place of the process shown in FIG. 4. In the sixth embodiment, any one of a processes shown in FIGS. 2 and 14 can be executed as the printing process. The hardware structure used for the printing process in the sixth embodiment is identical to the structure of the image-processing system 1000 shown in FIG. 1.

As will be described later, the process flag is set to one of "dither," "off," and "on" in the sixth embodiment. Thus, steps in the flowchart of FIG. 15 are similar to those in FIG. 4, but have been modified as described below to account for these process flags.

Modification F-1: step S240 is added as the step executed when the determination result in step S220 is NO. In step S240 the threshold process unit 260 determines whether the process flag is "on."

Modification F-2: step S250 is added as the step executed when the determination result in step S240 is YES. In step S250 the threshold process unit 260 sets the binary pixel value to ON. Following step S250, the process advances to S270.

Modification F-3: step S260 is executed when the determination result in step S240 is NO. Following step S260, the process advances to step S270.

Steps in FIG. 15 that are identical to those in FIG. 4 are designated with the same step numbers to avoid duplicating description.

In this way, the threshold process unit 260 determines whether the process flag is "off", "on," or "dither" (S220 and S240). The threshold process unit 260 then sets the binary pixel value based on the process flag (S230, S250, and S260).

Figure 16:
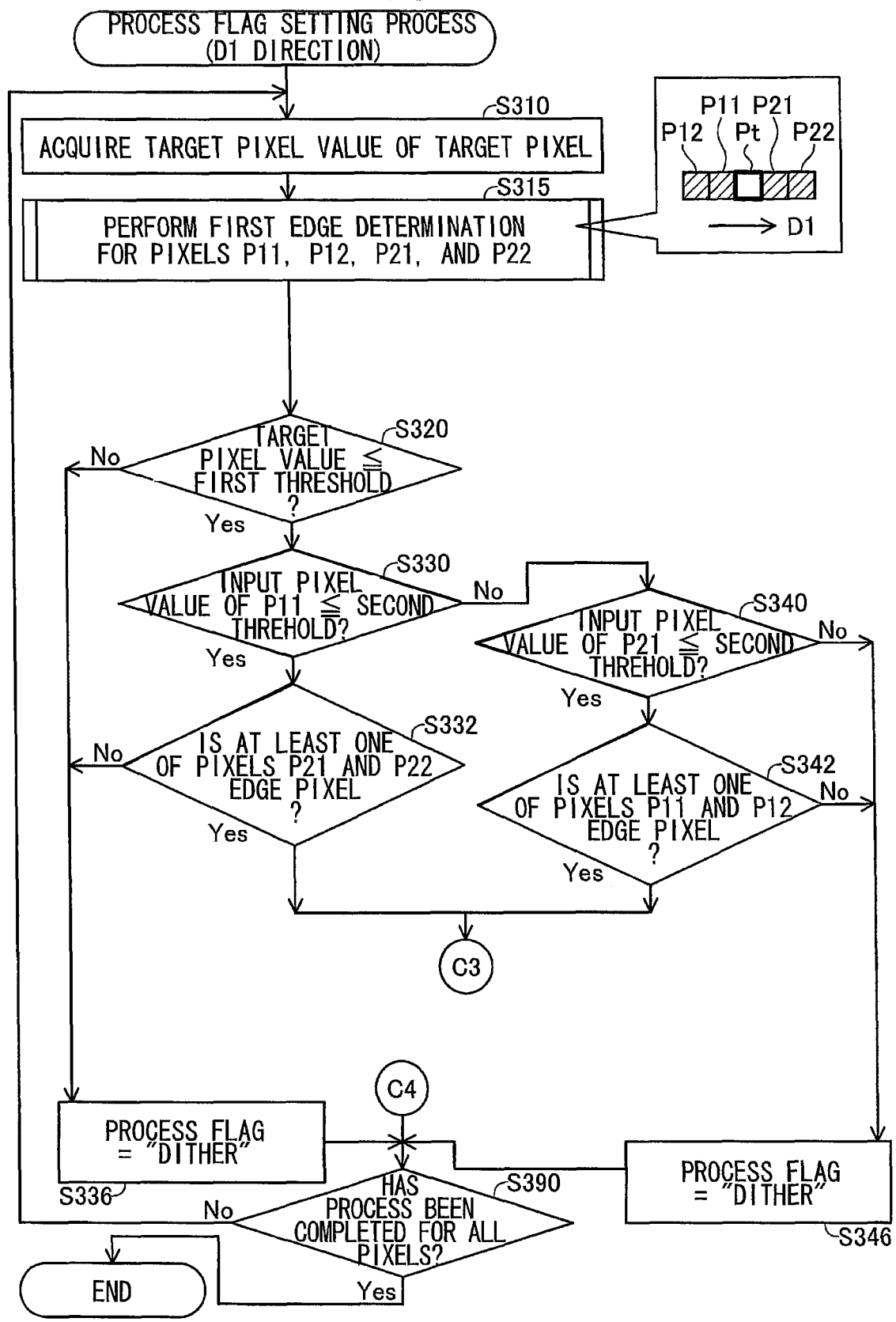
FIG. 16 is a flowchart illustrating a part of a process flag setting process according to the sixth embodiment.
Figure 17:
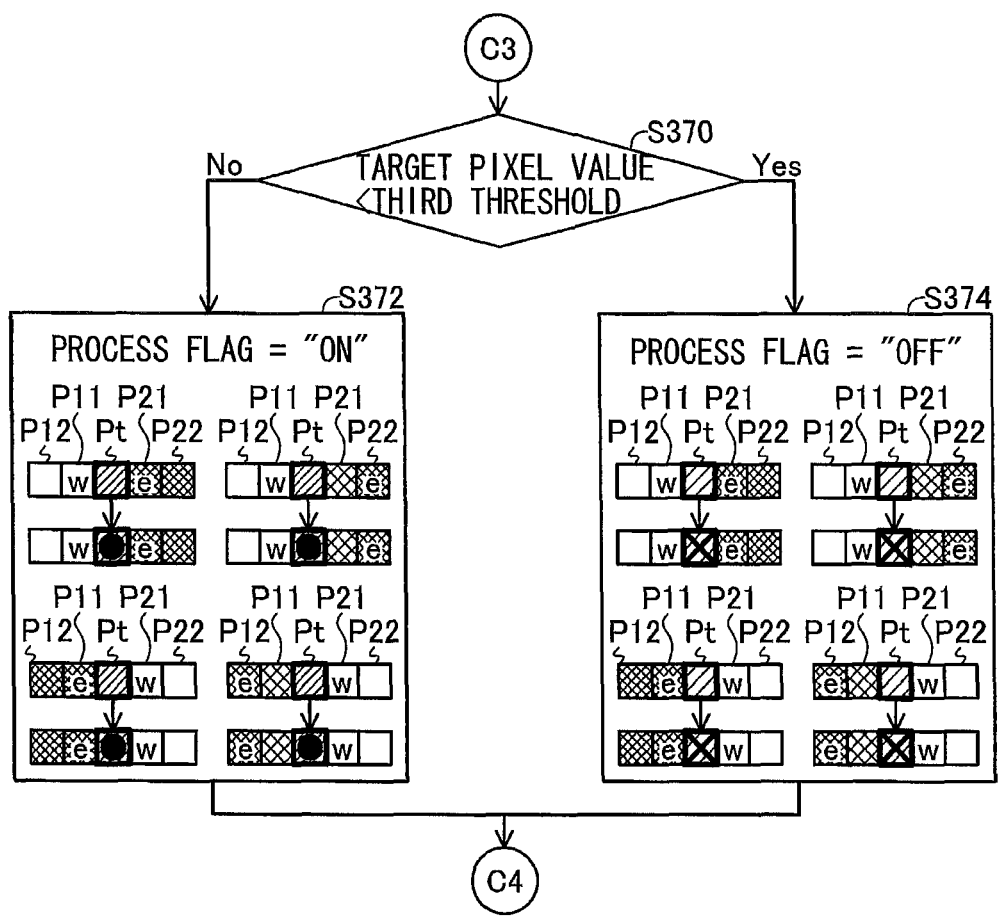
FIG. 17 is a flowchart illustrating a remaining part of a process flag setting process according to the sixth embodiment.

FIGS. 16 and 17 are flowcharts illustrating steps in a process-flag setting process according to the sixth embodiment (S130 of FIGS. 2 and 14). In the process-flag setting process according to the sixth embodiment, the threshold process unit 260 sets the process flag to either "off" or "on" based on the target pixel value when setting the process flag to something other than dither. Steps in the process of FIGS. 16 and 17 are similar to those in FIG. 5, with the following modifications.

Modification F-A: steps S334 and S344 are omitted and replaced with a common step S370 (FIG. 17) as the process executed when the determination result in step S332 is YES or when the determination result in step S342 is YES. In step S370 the threshold process unit 260 determines whether the target pixel value is less than a third threshold value.

Modification F-B: step S372 (FIG. 17) is added as the step executed when the determination result in step S372 is NO.

In step S372 the threshold process unit 260 sets the process flag to "on." Following step S372 the process advances to step S390 (FIG. 16).

Modification F-C: step S374 (FIG. 17) is added as the step executed when the determination result in step S370 is YES. In step S374 the threshold process unit 260 sets the process flag to "off." Following step S374 the process advances to step S390 (FIG. 16).

Steps in FIGS. 16 and 17 that are identical to those in FIG. 5 are designated with the same step numbers to avoid duplicating description.

As described above, the threshold process unit 260 determines in S370 of FIG. 17 whether the target pixel value is less than the third threshold value when determination results in S320, S330, and S332 of FIG. 16 are all YES or when determination results in S320, S340, and S342 are all YES. The third threshold value is set to a value for determining whether the color represented by the target pixel value is closer to the color represented by the minimum tone value or the color represented by the maximum tone value. For example, the third threshold value may be set to 128, which is the mean value of the minimum and maximum tone values.

If the target pixel value is less than the third threshold value (S370: YES), in S374 the threshold process unit 260 sets the process flag to "off." As in S334 and S344 of FIG. 5, in S374 the threshold process unit 260 sets the process flag to "off" for a target pixel Pt between an edge pixel e and a light pixel w. The box indicating step S374 in FIG. 17 includes a schematic diagram showing sample input pixel values for pixels Pt, P11, P12, P21, and P22 when the process flag is set to "off."

When the target pixel value is greater than or equal to the third threshold value (S370: NO), in S372 the threshold process unit 260 sets the process flag to "on." In S372 the threshold process unit 260 sets the process flag to "on" for a target pixel Pt between an edge pixel e and a light pixel w. The box indicating step S372 includes a schematic diagram showing sample input pixel values for pixels Pt, P11, P12, P21, and P22 when the process flag is set to "on." This schematic diagram is identical to that in S374, except that "off" has been changed to "on." The black dot added to the target pixel Pt indicates that the process flag is "on."

Using the example of FIG. 3(A), let's assume that the input pixel value of a print pixel in the third pixel column Cc is greater than or equal to the third threshold value while the input pixel value for a print pixel in the fourth pixel column Cd is less than the third threshold value. In this case, the threshold process unit 260 would set the process flag (i.e., binary pixel value) for the print pixel in the third pixel column Cc to "on" and the process flag for the print pixel in the fourth pixel column Cd to "off." This method can suppress the formation of finely textured patterns, such as that shown in FIG. 3(B). The method also suppresses a decline in the size of areas in which the binary pixel values have been set to ON. For example, the method prevents the vertical line constituting the character "d" from being made thinner as shown in FIG. 3(C).

While the third threshold value is set to the mean value of the minimum and maximum tone values, i.e., 128 in this example, the threshold value may be set to any of various values. Increasing the third threshold value further restricts binary pixel values from being set to ON in areas of intermediate tones, while decreasing the third threshold value further reduces the number of binary pixel values set to "off" in areas of intermediate tones. In light of these tendencies, the third threshold value may be set through experimentation. The third threshold value may be set to a value smaller than the first threshold value and greater than the minimum tone value, as a general rule.

In the sixth embodiment, the off-setting conditions for setting the process flag (i.e., binary pixel value) of a target pixel Pt to "off" includes the first and second conditions described in the first embodiment and the following sixth condition.

Sixth condition: the value of the target pixel Pt disposed in the first relative position must be less than the third threshold value (S370: YES).

If the sixth condition is not satisfied but all other off-setting conditions (the first and second conditions in this case) are satisfied, the threshold process unit 260 sets the process flag (i.e., binary pixel value) for the target pixel Pt to "on" without using a dither matrix.

C. Variations of the Embodiments (1) The first threshold value used in the process-flag setting process of the embodiments may be any of various values smaller than the maximum tone value and is not limited to 200. Increasing the first threshold value can reduce the noticeability of finely textured patterns in areas of intermediate tones in the input image caused by the use of dither matrices. Conversely, decreasing the first threshold value reduces the likelihood of binary pixel values being set without the use of a dither matrix in areas of tones having gradual density changes. In light of these tendencies, the first threshold value may be set through experimentation. The first threshold value may be set to a value smaller than the maximum tone value, such that the difference between the maximum tone value and the first threshold value is smaller than the difference between the first threshold value and the minimum tone value, as a general rule. In other words, the first threshold value may be set to a value closer to the maximum tone value than the minimum tone value.

(2) The second threshold value used in the process-flag setting process according to the embodiments may be any of various values and is not limited to 50. Increasing the second threshold value can reduce the noticeability of finely textured patterns formed in areas of intermediate tones in the input image due to the use of dither matrices. Conversely, decreasing the second threshold value can reduce the likelihood of binary pixel values being set without use of a dither matrix in areas of tones having gradual density changes. In light of these tendencies, the second threshold value may be set through experimentation. The second threshold value may be set to a value closer to the minimum tone value than the maximum tone value, such that the difference between the maximum tone value and the second threshold value is greater than the difference between the second threshold value and the minimum tone value, as a general rule.

(3) The first relative position, i.e., the relative position of the target pixel Pt whose binary pixel value is set without use of a dither matrix in the process-flag setting process of the embodiments may be any of various positions and is not limited to the first and second pixel positions from an edge pixel e. As a general rule, the first relative position may be a preselected position from an area adjacent to (bordering) an edge pixel e (for example, within a Euclidean distance equivalent to ten pixels from the edge pixel e). The first relative position preferably includes a pixel position not adjacent to (bordering) the edge pixel e. This method can suppress the formation of finely textured patterns in areas of intermediate tones separated from the edge pixel e. Further, the first relative position preferably includes a pixel position adjacent to (bordering) the edge pixel e. This method can suppress the formation of finely textured patterns at pixel positions adjacent to the edge pixel e.

(4) The second relative position, i.e., the relative position of the reference pixel used to determine whether the input pixel value is less than or equal to the second threshold value in the process-flag setting process of the embodiments may be set to any of various positions and is not limited to pixels adjacent to (bordering) the target pixel Pt. For example, the second relative position may be set to a pixel position separated from the target pixel Pt. The second relative position may be a position confronting the target pixel Pt on the opposite side of the edge pixel e, as a general rule.

(5) While the compound thresholding process is applied to text objects in the process-flag setting process of FIG. 10, this compound thresholding process may be applied to any object type, such as graphics objects. Object types that tend to acquire finely textured patterns along their edges due to the use of dither matrices may be identified in advance through experimentation by analyzing the printed results of various object types. The threshold process unit 260 may then apply the compound thresholding process to print pixels in regions representing the types of objects identified through experimentation.

(6) The method of identifying the types of objects in the input image is arbitrary and is not limited to the method of analyzing the input image described in FIG. 10. For example, when the image data representing the input image is described in a page description language, the object type identification unit 240 may identify the types of objects in the input image by analyzing drawing commands found in the page description language.

(7) The dither matrices employed in the thresholding process described in FIG. 12 are not limited to dither matrices with different line numbers, but may be any types of dither matrices that can form differing patterns in binary images from the same input pixel values. For example, the dither matrices may differ in how they change the binary image (the dot growth process, for example) as the input pixel value is increased in a solid region of uniform input pixel values.

Further, the dither matrix to be used in the thresholding process may be selected according to any method and need not be selected using a method based on object type. For example, the matrix selection unit 250 may select a dither matrix specified in the input image data for a specific region when the preferred dither matrix for specific regions in the input image has been established (or when the preferred dither matrix for specific regions in the input image is predetermined).

In any case, dither matrices that tend to produce noticeable finely textured patterns in areas along object edges in a printed image may be identified in advance through experimentation by analyzing the printed results obtained using various different dither matrices. The threshold process unit 260 may then execute the compound thresholding process when the dither matrix identified through experimentation is used.

(8) Various conditions may be used to determine whether to set binary pixel values without the use of dither matrices and are not limited to the conditions described in the embodiments. For example, the off-setting conditions may include the following seventh condition.

Seventh condition: the input pixel value (i.e., target pixel value) of a target pixel Pt disposed in the first relative position must be smaller than the input pixel value of the edge pixel e and larger than the input pixel value of a reference pixel disposed in the second relative position.

By employing the seventh condition, the thresholding process is performed without use of a dither matrix in areas where the density grows gradually lighter from the edge pixel e toward the light pixel w. Accordingly, this method can suppress the formation of finely textured patterns caused by use of a dither matrix in areas of intermediate tones near an edge pixel e produced in the anti-aliasing process.

(9) Various conditions may be used for determining whether to set a binary pixel value to a prescribed value ("off," for example) without use of a dither matrix and are not limited to the conditions described above in the embodiments. For example, any combination of the first through seventh conditions described above that includes at least the first and second conditions may be used as the off-setting conditions for setting the binary pixel value to "off." Similarly, any combination of the first through seventh conditions that includes at least the first and second conditions and does not include the sixth condition may be used as conditions for setting a binary pixel value to "on."

(10) The process-flag setting process for both the first direction D1 and the second direction D2 described in FIGS. 7 and 8 may also be employed in the other embodiments. When this bi-directional process-flag setting process is applied to the example of FIG. 15, the process described in FIG. 17 for setting the process flag to either "on" or "off" based on the results of comparing the target pixel value to the third threshold value should be employed in place of steps S334, S344, S354, and S364 of FIGS. 7 and 8.

(11) In the above embodiments, the threshold process unit 260 may instead function to set the process flag to "on" rather than "off." For example, the threshold process unit 260 may set the process flag to "on" in steps S334, S344, S354, and S364 in FIGS. 5, 7, 8, 10, and 12. In this case, the threshold process unit 260 can set a binary pixel value to ON in areas of intermediate tones near the edge pixel e (see FIG. 3(A)) to suppress the formation of finely textured patterns caused by use of a dither matrix.

(12) Any of various methods may be employed in the above embodiments for detecting an edge pixel e based on a large change in pixel value relative to a change in pixel position. For example, the edge identification unit 230 may detect a print pixel to be an edge pixel e when the edge strength of the print pixel obtained using a Sobel filter is larger than a prescribed threshold.

(13) The combination of colorants used by the print execution unit 180 is arbitrary and is not limited to the color combination cyan, magenta, yellow, and black. For example, the print execution unit 180 may use only colorant in black or may use colorants in cyan, magenta, and yellow but not black. The print execution unit 180 may also use colorants in other hues, such as red and green. In all of these cases, the compound thresholding process is preferably applied to print pixels formed in colorant that produces more noticeable finely textured patterns. For example, when the print execution unit 180 uses colorants in cyan, magenta, and yellow, the compound thresholding process is preferably applied to at least one of the colors cyan and magenta. In general, finely textured patterns produced in black colorant are more noticeable than finely textured patterns produced in colorants of chromatic colors. Therefore, if the print execution unit 180 can use colorant in a plurality of colors including black, the compound thresholding process is preferably applied at least to black.

(14) The image data IM2 provided to the multifunction peripheral 100 may be in various formats and is not limited to the JPEG format. For example, image data that has been rasterized and color-converted as described in FIG. 2 (i.e., the input image data) may be provided directly to the multifunction peripheral 100 as the image data IM2. In this case, the pre-process unit 220 may be omitted from the multifunction peripheral 100. In addition, the device that generates the image data IM2 for printing is not limited to the server 400, but may be any device, such as the portable terminal 300.

The print execution unit 180 may also be configured to use the binary image data generated by the threshold process unit 260. In this case, the data output unit 270 may supply the binary image data generated by the threshold process unit 260 directly to the print execution unit 180 as the print data. As a general rule, the data output unit 270 may use the binary image data to produce print data in a format that the print execution unit 180 can use for printing and supply this print data to the print execution unit 180.

(15) The image processing device that executes the thresholding process on input image data to produce data for printing (binary image data, for example) is not limited to the multifunction peripheral 100 but may be any of various devices, such as a personal computer, digital camera, or mobile phone. Further, the function of the thresholding process using input image data may be shared among a plurality of devices (computers, for example) capable of communicating over a network, so that the devices as a whole can provide the function of the thresholding process (here, the system having the devices corresponds to the image processing device).

(16) Part of the configuration of the invention implemented in hardware in the embodiments described above may be replaced by software and, conversely, part of the configuration of the invention implemented in software may be replaced by hardware. For example, the function of the threshold process unit 260 shown in FIG. 1 is implemented in a specific hardware having a logic circuit.

When all or part of the functions of the present invention are implemented with computer programs, the programs can be stored on a computer-readable storage medium (a non-temporary storage medium, for example). The programs may be used on the same storage medium on which they are supplied, or may be transferred to a different storage medium (computer-readable storage medium). The "computer-readable storage medium" may be a portable storage medium, such as a memory card or a CD-ROM; an internal storage device built into the computer, such as any of various ROM or the like; or an external storage device, such as a hard disk drive, connected to the computer.

(17) The off-setting conditions are limited to the above described conditions. The off-setting condition may indicate that that a pixel value of the edge pixel e, a pixel value of the target pixel Pt, and a pixel value of the reference pixel monotonically increase or monotonically decrease in said order.

While the invention has been described in detail with reference to the embodiments thereof, it would be apparent to those skilled in the art that various changes and modifications may be made therein without departing from the scope of the invention.

What is claimed is:

1. An image processing device comprising:
a controller configured to perform:
receiving image data representing an image, the image having a plurality of pixels, the image data having a plurality of pixel values corresponding to the plurality of pixels;
specifying an edge pixel based on the image data, the edge pixel representing an edge;
setting a target pixel and a reference pixel from among the plurality of pixels, the reference pixel being located out of the edge, the target pixel being located between the edge pixel and the reference pixel;
determining whether a determination condition is satisfied for the target pixel, the determination condition indicating that a pixel value of the edge pixel, a pixel value of the target pixel, and a pixel value of the reference pixel monotonically increase in said order;
setting a binary value of the target pixel to a first value without using a dither matrix when the determination condition is satisfied for the target pixel; and
setting the binary value of the target pixel to one of the first value and a second value different from the first value by using the dither matrix when the determination condition is not satisfied for the target pixel.

2. The image processing device according to claim 1, wherein each of the plurality of pixel values is defined between a maximum tone value and a minimum tone value,
wherein the target pixel is located in a prescribed regional range from the edge pixel,
wherein the determination condition includes a first condition and a second condition, the first condition being that the pixel value of the target pixel is less than or equal to a first threshold value, a first difference between the maximum tone value and the first threshold value being less than a second difference between the first threshold value and the minimum tone value, the second condition being that a pixel value of the reference pixel is less than or equal to a second threshold value, a third difference between a maximum tone value and the second threshold value being larger than a fourth difference between the second threshold value and the minimum tone value.

3. The image processing device according to claim 1, wherein the reference pixel is bordering the target pixel.

4. The image processing device according to claim 2, wherein the prescribed regional range encompasses a pixel separate from the edge pixel.

5. The image processing device according to claim 2, wherein the controller is further configured to perform:
extracting an object from the image; and
identifying a type of the extracted object,
wherein the determination condition further includes an object type condition that the type of the object represented by the target pixel is a specific type.

6. The image processing device according to claim 2, wherein the controller is further configured to perform selecting a dither matrix from among a plurality of matrices different from one another,
wherein the determination condition further includes a dither matrix condition that a selected dither matrix is a specific dither matrix.

7. The image processing device according to claim 6, wherein the controller is further configured to perform:
extracting an object from the image; and
identifying a type of the extracted object,
wherein the controller selects the dither matrix from among the plurality of matrices based on the type of the extracted object.

8. The image processing device according to claim 2, wherein the controller is further configured to perform receiving a user's instruction permitting to set the binary value of the target pixel without using the dither matrix,
wherein the determination condition further includes an instruction condition that the user's instruction which is permitted to set the binary value of the target pixel without using dither matrix is received.

9. The image processing device according to claim 2, wherein the first value represents color lighter than color represented by the second value.

10. The image processing device according to claim 9, wherein the determination condition further includes a pixel value condition that the pixel value of the target pixel is less than a third threshold value, the third threshold value being greater than the minimum tone value and less than the first threshold value,
 wherein the controller is further configured to set the binary value of the target pixel to the second value without using the dither matrix when the first condition and the second condition are satisfied and the pixel value condition is not satisfied for the target pixel.

11. The image processing device according to claim 1, wherein each of the plurality of pixel values has a plurality of color elements including black element representing a black material,
 wherein the controller is configured to perform setting a binary value of the target pixel corresponding to the black element without using the dither matrix when the determination condition is satisfied for the target pixel.

12. The image processing device according to claim 2, wherein when the controller specifies the edge pixel, the controller is configured to perform:
 setting a determination pixel and neighboring pixels between which the determination pixel is located;
 calculating a difference in pixel values of neighboring pixels; and
 specifying the determination pixel as the edge pixel when an absolute value of the difference is greater than an edge threshold value.

13. A non-transitory computer readable storage medium storing a set of program instructions installed on and executed by a computer, the program instructions comprising:
 receiving image data representing an image, the image having a plurality of pixels, the image data having a plurality of pixel values corresponding to the plurality of pixels;
 specifying an edge pixel based on the image data, the edge pixel representing an edge;
 setting a target pixel and a reference pixel from among the plurality of pixels, the reference pixel being located out of the edge, the target pixel being located between the edge pixel and the reference pixel;
 determining whether a determination condition is satisfied for the target pixel, the determination condition indicating that a pixel value of the edge pixel, a pixel value of the target pixel, and a pixel value of the reference pixel monotonically increase in said order;
 setting a binary value of the target pixel to a first value without using a dither matrix when the determination condition is satisfied for the target pixel; and
 setting the binary value of the target pixel to one of the first value and a second value different from the first value by using the dither matrix when the determination condition is not satisfied for the target pixel.

* * * * *